United States Patent
Ohashi

(10) Patent No.: US 7,663,808 B2
(45) Date of Patent: Feb. 16, 2010

(54) ZOOM LENS, IMAGING DEVICE, AND PERSONAL DIGITAL ASSISTANT

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 11/873,078

(22) Filed: Oct. 16, 2007

(65) Prior Publication Data

US 2009/0091841 A1   Apr. 9, 2009

(30) Foreign Application Priority Data

Oct. 16, 2006   (JP)   ............... 2006-281814

(51) Int. Cl.
 *G02B 15/14*   (2006.01)
(52) U.S. Cl. ...................... 359/687; 359/690
(58) Field of Classification Search ................ 359/676, 359/683, 686, 687, 689, 690
 See application file for complete search history.

(56) References Cited

U.S. PATENT DOCUMENTS

| | | |
|---|---|---|
| 5,153,779 A | 10/1992 | Ohashi |
| 5,398,135 A | 3/1995 | Ohashi |
| 5,576,891 A | 11/1996 | Ohashi |
| 5,581,319 A | 12/1996 | Ohashi |
| 5,617,254 A | 4/1997 | Ohashi |
| 5,630,188 A | 5/1997 | Ohashi |
| 5,687,401 A | 11/1997 | Kawamura et al. |
| 5,930,056 A | 7/1999 | Ohashi |
| 6,353,506 B1 | 3/2002 | Ohashi |
| 6,525,885 B2 | 2/2003 | Ohashi |
| 6,747,818 B2 | 6/2004 | Ohashi et al. |
| 6,771,433 B2 | 8/2004 | Ohashi |
| 6,829,102 B2 | 12/2004 | Ohashi et al. |
| 6,839,183 B2 | 1/2005 | Ohashi |
| 6,839,185 B2 | 1/2005 | Ohashi |
| 6,995,921 B2 | 2/2006 | Ohashi |
| 7,038,858 B2 | 5/2006 | Ohashi |
| 7,095,564 B2 | 8/2006 | Ohashi |
| 7,151,638 B2 | 12/2006 | Ohashi |

(Continued)

FOREIGN PATENT DOCUMENTS

JP   2006-113453   4/2006

(Continued)

OTHER PUBLICATIONS

U.S. Appl. No. 12/102,257, filed Apr. 14, 2008, Ohashi.

(Continued)

*Primary Examiner*—Jack Dinh
(74) *Attorney, Agent, or Firm*—Oblon, Spivak, McClelland, Maier & Neustadt, L.L.P.

(57) ABSTRACT

The invention provides a zoom lens including at least a first lens group having a positive refracting power, a second lens group having a negative refracting power, a third lens group having a positive refracting power, in order from an object side, and an aperture stop between the second lens group and the third lens group, wherein, in changing magnification from a wide angle end toward a telephoto end, at least the first lens group and the third lens group move toward the object side so as to increase a spacing between the first lens group and the second lens group, and to decrease a spacing between the second lens group and the third lens group.

17 Claims, 12 Drawing Sheets

U.S. PATENT DOCUMENTS

| | | |
|---|---|---|
| 7,164,542 B2 | 1/2007 | Ohashi |
| 7,167,320 B2 | 1/2007 | Ohashi |
| 7,362,510 B2 * | 4/2008 | Nanjo et al. ................ 359/687 |
| 7,535,654 B2 * | 5/2009 | Ohashi ...................... 359/690 |
| 2005/0094002 A1 | 5/2005 | Ohashi |
| 2005/0270663 A1 | 12/2005 | Ohashi |
| 2006/0017836 A1 | 1/2006 | Nuno |
| 2006/0193062 A1 | 8/2006 | Ohashi |
| 2006/0262422 A1 | 11/2006 | Ohashi |
| 2007/0097517 A1 | 5/2007 | Ohashi |
| 2007/0297068 A1 | 12/2007 | Ohashi |

FOREIGN PATENT DOCUMENTS

| | | |
|---|---|---|
| JP | 2006-133632 | 5/2006 |
| JP | 2006-235062 | 9/2006 |

OTHER PUBLICATIONS

U.S. Appl. No. 11/572,750, filed Jan. 26, 2007, Nuno.

U.S. Appl. No. 11/771,300, filed Jun. 29, 2007, Ohashi.

* cited by examiner

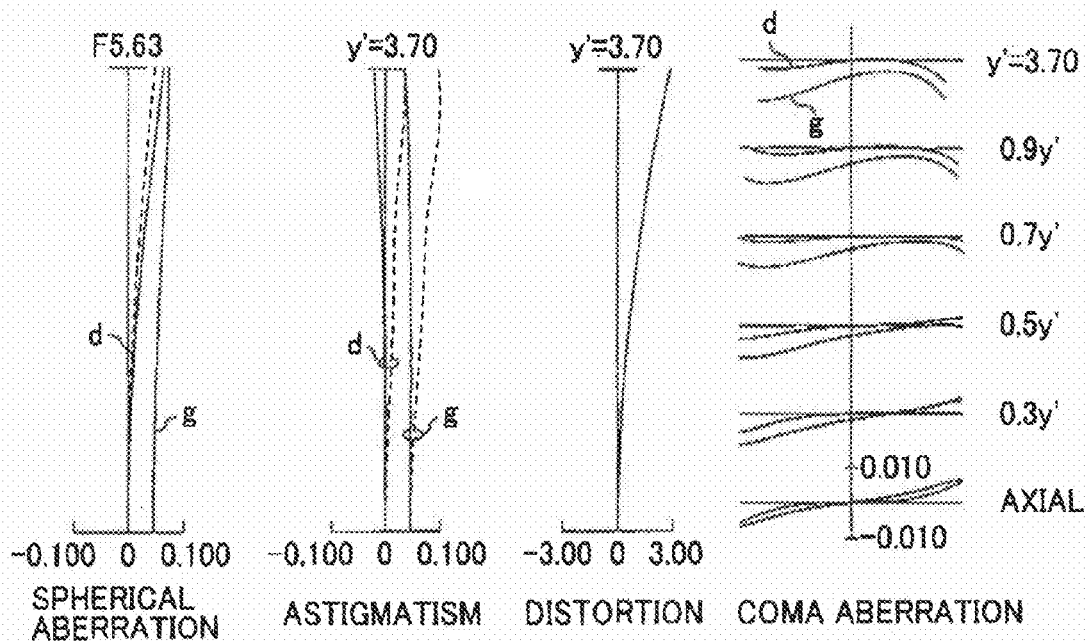
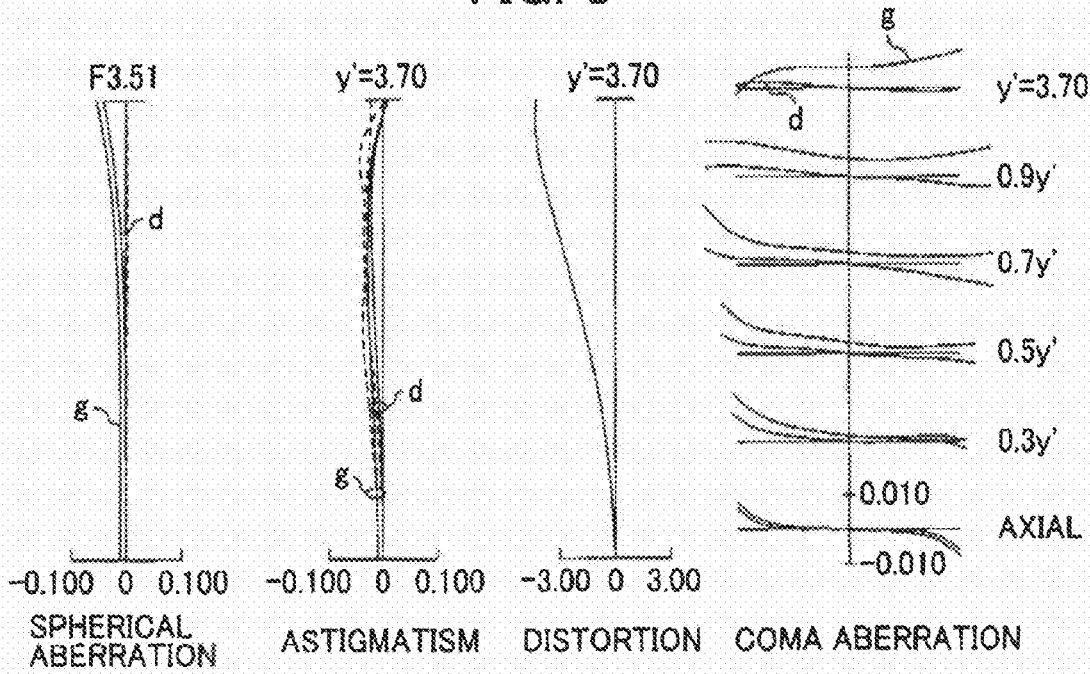

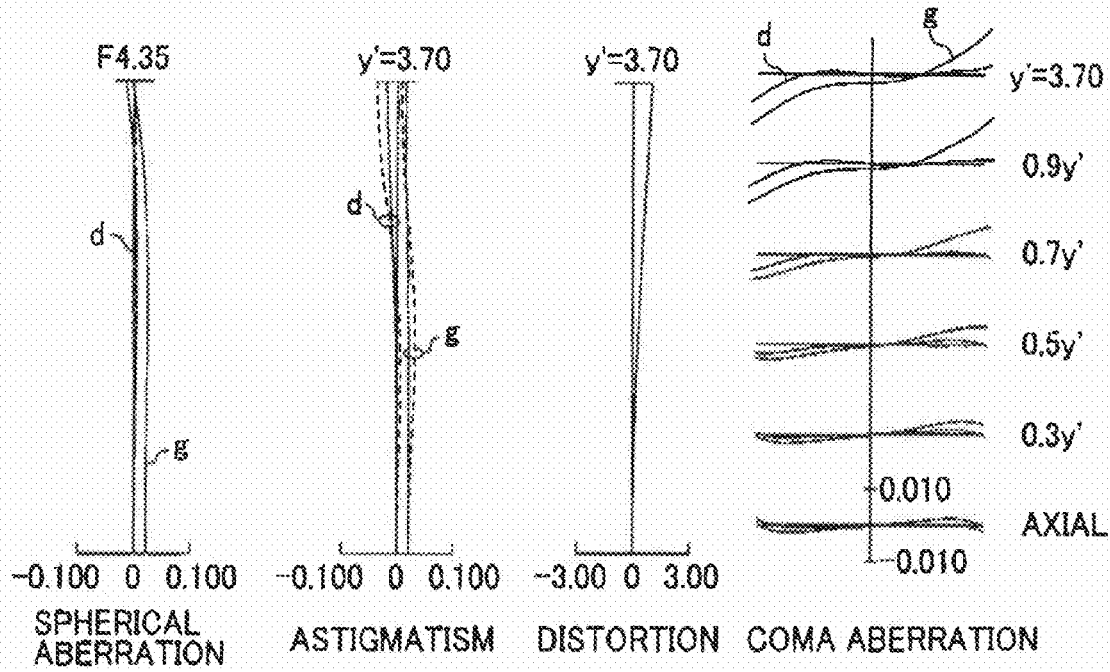
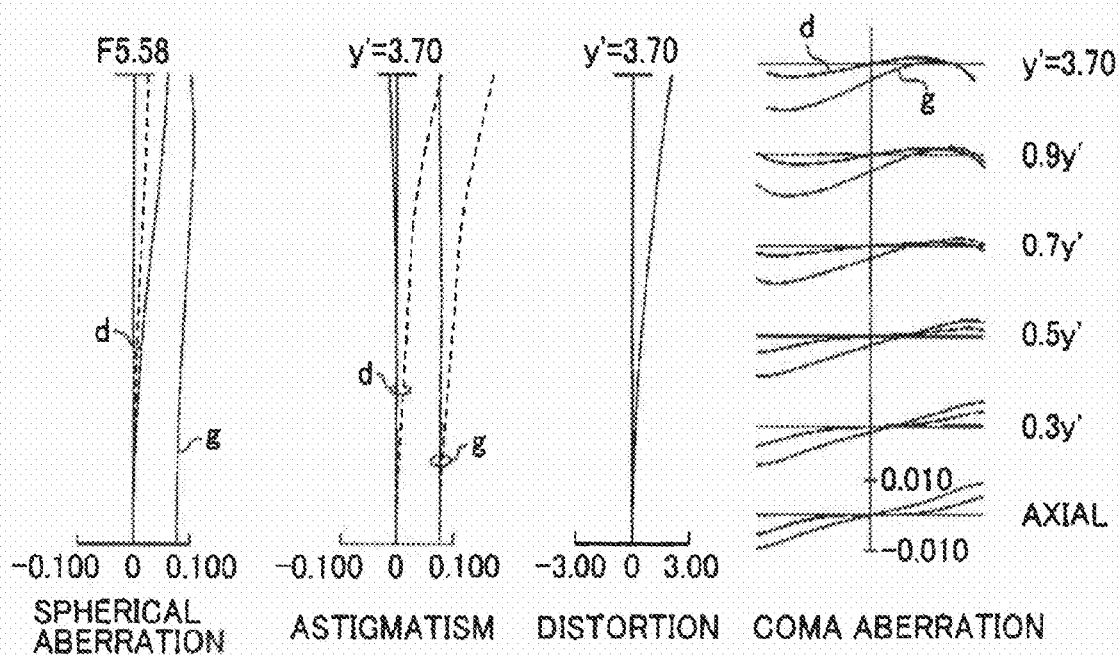

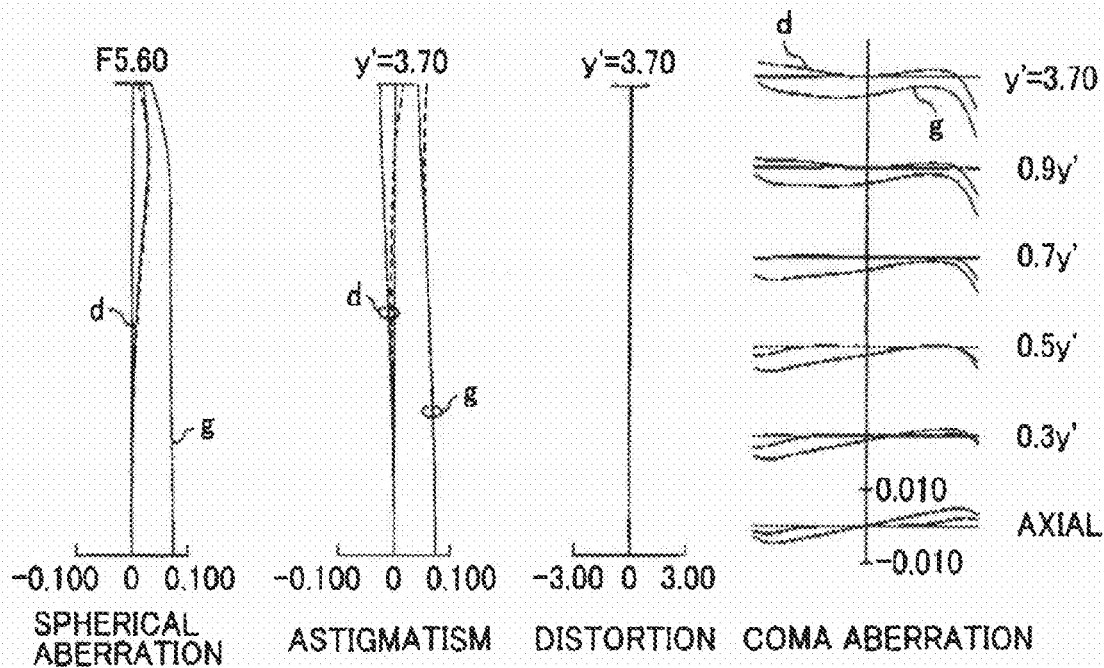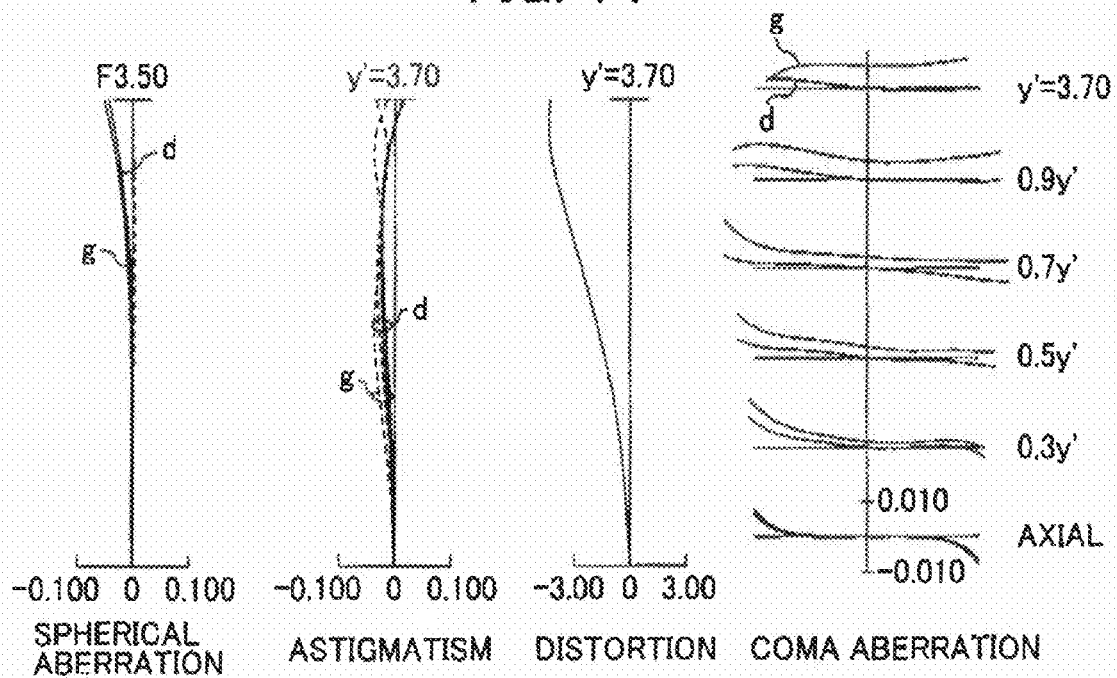

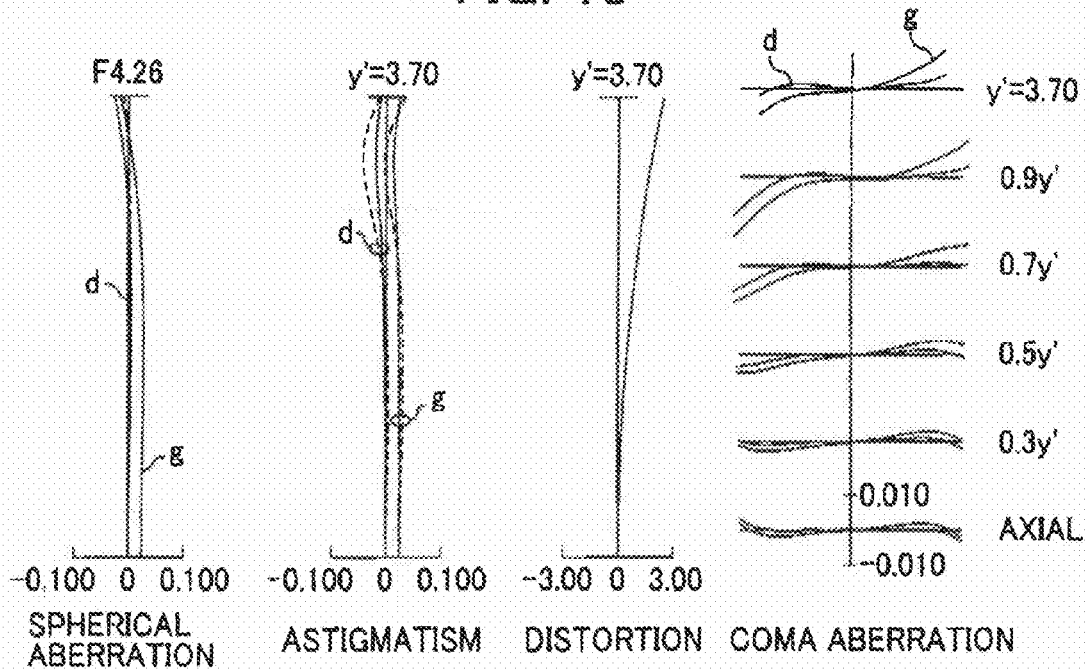
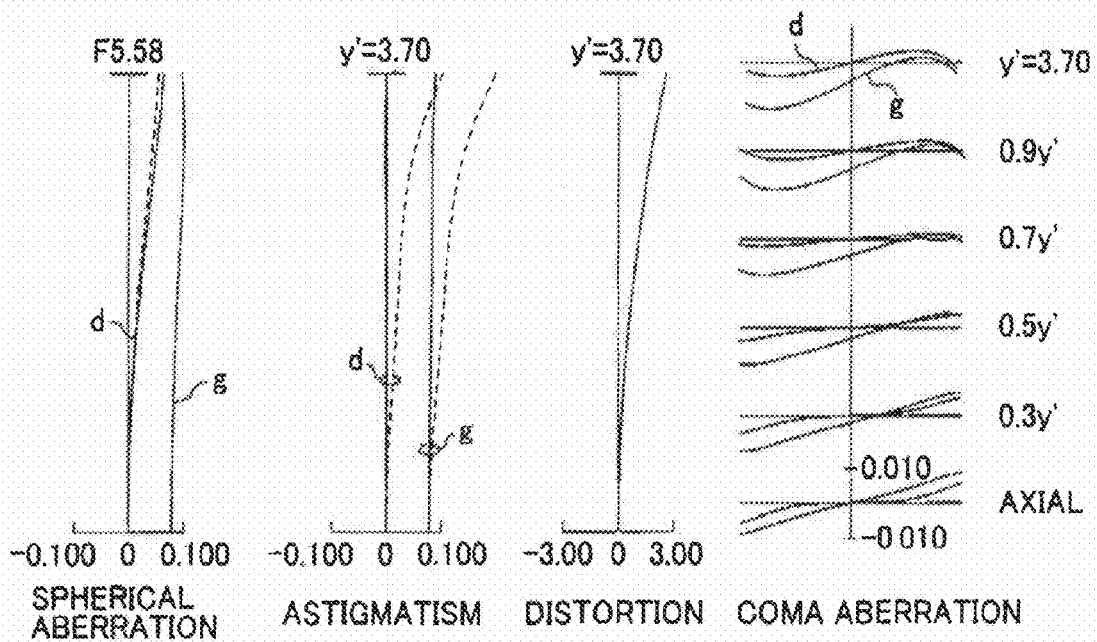

ZOOM LENS, IMAGING DEVICE, AND PERSONAL DIGITAL ASSISTANT

PRIORITY CLAIM

The present application is based on and claims priority from Japanese Application Number 2006-281814, filed with the Japanese Patent Office on Oct. 16, 2006, the disclosure of which is hereby incorporated by reference herein in its entirety.

BACKGROUND OF THE INVENTION

1. Field of the Invention

The present invention relates to a zoom lens, an imaging device, and a personal digital assistant.

2. Description of the Related Art

Accompanied with the wide spread of the imaging device represented by a digital camera, the general trend seeks for further improvement of the quality of a photographed image and further downsizing of the body, and it seeks for higher performance compatible with further downsizing of the zoom lens used as a photographing lens.

In view of further downsizing of the zoom lens, first, it is necessary to shorten the total lens length in use (distance from the lens surface on the most object side to the image surface), and it is also important to reduce the thickness of each lens group to thereby shorten the total length in storage.

In view of seeking a higher performance, it is preferable to secure a resolving power equivalent to an imaging element of at least 5 to 8 million pixels, throughout the whole zooming range.

Further, a wider angle of view of the zoom lens is strongly requested, and it is preferable that the half angle of view at the wide angle end is 38 degrees or more corresponding to the focal length 28 mm in conversion to the 35 mm film-based camera (the so-called Leica type). The changing magnification rate is also desired to be as high as possible; provided that the zoom lens has the changing magnification rate corresponding to the focal length 28 to 200 mm in conversion to the 35 mm film-based camera, it is considered as possible to deal with almost all of general photographing.

There are various types of the zoom lenses for the digital camera. As a zoom lens suitable for a higher changing magnification rate, the patent documents: JP-A 2006-113453, JP-A 2006-133632, JP-A2006-235062, and so forth disclose zoom lenses having such a configuration that a first lens group has a positive refracting power, a second lens group has a negative refracting power, and a third lens group has a positive refracting power in order from the object side; and at least the first lens group and the third lens group move toward the object side in changing magnification from the wide angle end toward the telephoto end, in such a manner that a spacing between the first lens group and the second lens group increases and a spacing between the second lens and the third lens decreases, which have a wide angle range 38 degrees or more in the half angle of view or close to it, and have a sufficiently high changing magnification rate over 6.5.

However, the zoom lenses disclosed in the above patent documents embrace the following problems.

In the zoom lens disclosed in the patent document JP-A 2006-113453, the number of the total lenses configuring the zoom lens is as many as 13 to 17, except the example 6 of which half angle of view at the wide angle end is rather small, 26.5 degrees, and the lens configuration is complicated. And, it is difficult to sufficiently meet the demands of recent users in further downsizing, especially, the reduction of the total length in storage, and the reduction of the cost.

In the zoom lens disclosed in the document JP-A 2006-133632, the number of the total lenses is 11, and it is not too many. However, each lens group has a significant thickness, and it is difficult to reduce the total length in storage.

Of the zoom lenses disclosed in the document JP-A 2006-235062, the one disclosed in the fourth embodiment achieves the changing magnification rate 6.5 or more with the number of the total lenses of 10, and the thickness of each lens group is comparably reduced. However, the total lens length at the telephoto end is somewhat long, and the size at the telephoto end as the information device is somewhat large.

SUMMARY OF THE INVENTION

In order to solve the above issue, the present invention has been made in view of the above circumstances, and provides a zoom lens that realizes a half angle of view 38 degrees or more at the wide angle end, a changing magnification rate 6.5 or more, and a resolving power equivalent to an imaging element having 5 to 8 million pixels in a manner that both the maximum total lens length and the thickness of each lens group are sufficiently reduced, an imaging device incorporating the above zoom lens, and a personal digital assistant incorporating the imaging device.

According to a first aspect of the invention, a zoom lens includes, in order from an object side, at least a first lens group having a positive refracting power, a second lens group having a negative refracting power, a third lens group having a positive refracting power, and an aperture stop disposed between the second lens group and the third lens group. And, in changing magnification from a wide angle end toward a telephoto end, at least the first lens group and the third lens group move toward the object side so as to increase a spacing between the first lens group and the second lens group, and to decrease a spacing between the second lens group and the third lens group. In the zoom lens having this configuration, an average $N_{d2G}$ of refractive indexes in d-lines of all lenses in the second lens group satisfies the following condition:

$$1.90 < N_{d2G} < 2.10. \tag{1}$$

Preferably, the average $N_{d2G}$ of the refractive indexes in the d-lines of the all lenses in the second lens group satisfies the following condition.

$$1.93 < N_{d2G} < 2.10. \tag{1A}$$

Preferably, the second lens group of the zoom lens includes three lenses or less.

Preferably, the average $v_{d2GN}$ of the Abbe numbers of the negative lenses configuring the second lens group and the average $v_{d2GP}$ of the Abbe numbers of the positive lenses configuring the second lens group satisfy the following conditions:

$$25.0 < v_{d2GN} < 45.0 \tag{2A}$$

$$15.0 < v_{d2GP} < 23.0. \tag{2B}$$

Preferably, an average $v_{d2GN}$ of Abbe numbers of the negative lenses configuring the second lens group and an average $v_{d2GP}$ of Abbe numbers of the positive lenses configuring the second lens group satisfy the following condition:

$$7.0 < v_{d2GN} - v_{d2GP} < 25.0. \tag{3}$$

Preferably, the zoom lens includes a fourth lens group having a positive refracting power on the image side of the third lens group, and performs a focusing to an object within a finite distance by a movement of the fourth lens group.

Preferably, the zoom lens has a subsequent lens group on the image side of the fourth lens group.

Preferably, a whole movement $X_1$ of the first lens group in changing magnification from the wide angle end toward the telephoto end and a focal length $f_T$ of the whole system at the telephoto end satisfy the following condition:

$$0.20 < X_1/f_T < 0.70. \quad (4)$$

Preferably, a whole movement $X_3$ of the third lens group in changing magnification from the wide angle end toward the telephoto end satisfies the following condition:

$$0.15 < X_3/f_T < 0.40. \quad (5)$$

Preferably, a focal length $f_2$ of the second lens group and a focal length $f_3$ of the third lens group satisfy the following condition:

$$0.45 < |f_2|/f_3 < 0.85. \quad (6)$$

Preferably, a focal length $f_1$ of the first lens group satisfies the following condition:

$$5.0 < f_1/f_w < 11.0, \quad (7)$$

wherein $f_w$ is a focal length of the whole system at the wide angle end.

Preferably, of the refractive indexes of the each lens configuring the second lens group, the lowest refractive index is 1.85 or more, and at least one of the lenses configuring the second lens group has a refractive index 2.00 or more.

Preferably, the number of the lenses configuring the zoom lens does not exceed 12.

According to a second aspect of the invention, an imaging device has as a photographing zoom lens a zoom lens including: in order from an object side, at least a first lens group having a positive refracting power, a second lens group having a negative refracting power, a third lens group having a positive refracting power, and an aperture stop between the second lens group and the third lens group, wherein, in changing magnification from a wide angle end toward a telephoto end, at least the first lens group and the third lens group move toward the object side so as to increase a spacing between the first lens group and the second lens group, and to decrease a spacing between the second lens group and the third lens group. In the imaging device having this configuration, an average $N_{d2G}$ of refractive indexes in d-lines of all lenses in the second lens group satisfies the following condition:

$$1.90 < N_{d2G} < 2.10. \quad (1)$$

Preferably, the imaging device forms an object image by the zoom lens on a light-receiving surface of a color imaging element.

Preferably, the number of pixels of the imaging device is 5 to 8 million pixels or more.

According to a third aspect of the invention, a personal digital assistant includes an imaging device having as a photographing zoom lens a zoom lens including: in order from an object side, at least a first lens group having a positive refracting power, a second lens group having a negative refracting power, a third lens group having a positive refracting power, and an aperture stop between the second lens group and the third lens group, wherein, in changing magnification from a wide angle end toward a telephoto end, at least the first lens group and the third lens group move toward the object side so as to increase a spacing between the first lens group and the second lens group, and to decrease a spacing between the second lens group and the third lens group. In the personal digital assistant having this configuration, an average $N_{d2G}$ of refractive indexes in d-lines of all lenses in the second lens group satisfies the following condition:

$$1.90 < N_{d2G} < 2.10. \quad (1)$$

BRIEF DESCRIPTION OF THE DRAWINGS

The above and other objects, features and advantages of the present invention will become more apparent from the following description taken in connection with the accompanying drawings, in which:

FIG. 7 is a drawing illustrating the aberration at the long focus end in the embodiment 1;

FIG. 8 is a drawing illustrating the aberration at the short focus end in the embodiment 2;

FIG. 9 is a drawing illustrating the aberration at the medium focal length in the embodiment 2;

FIG. 10 is a drawing illustrating the aberration at the long focus end in the embodiment 2;

FIG. 13 is a drawing illustrating the aberration at the long focus end in the embodiment 3;

FIG. 14 is a drawing illustrating the aberration at the short focus end in the embodiment 4;

FIG. 15 is a drawing illustrating the aberration at the medium focal length in the embodiment 4;

FIG. 16 is a drawing illustrating the aberration at the long focus end in the embodiment 4;

DESCRIPTION OF THE PREFERRED EMBODIMENTS

Figure 1:
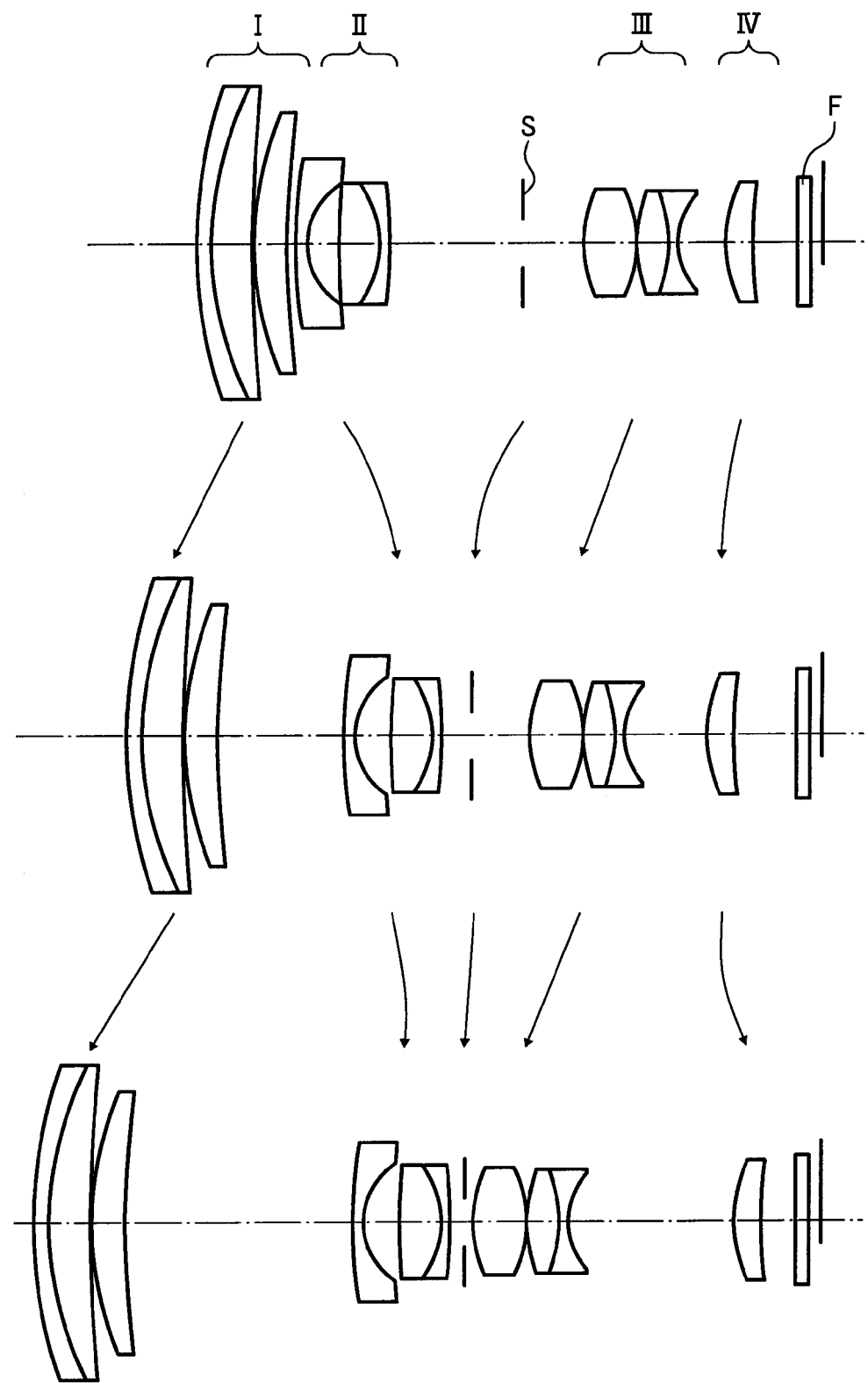
FIG. 1 is a drawing illustrating the configuration of a zoom lens and the movement along with changing magnification in the embodiment 1.

The following are complementary descriptions to the zoom lens according to this invention.

In the zoom lens that consist of the three groups of a positive/negative/positive, the four group configuration of a positive/negative/positive/positive, or the configuration with a subsequent group further added, as the zoom lens of this invention, it is a common practice that the second lens group is made up as the so-called variator taking on the principal changing magnification function. However in this invention, by providing the zoom lens with a configuration such that 'in changing magnification from the wide angle end toward the telephoto end, at least the first lens group and the third lens group move toward the object side so as to increase the spacing between the first lens group and the second lens group, and to decrease the spacing between the second lens group and the third lens group, the zoom lens of this invention makes the third lens group share the burden of the changing magnification, to thereby lighten the burden on the second lens group, thus securing the degree of freedom of the correction of aberration, which becomes difficult accompanied with pursuing a wider angle and a higher changing magnification.

In other words, in changing magnification from the wide angle end toward the telephoto end, the spacing between the first lens group and the second lens group increases, and the spacing between the second lens group and the third lens group decreases; as the result, the magnification (absolute values) of both the second lens group and the third lens group increase, and the first lens group and the second lens group share the changing magnification function.

And in changing magnification from the wide angle end toward the telephoto end, a significant movement of the first lens group toward the object side will lower the height of light rays passing the first lens group at the wide angle end, to thereby restrain a size increase of the first lens group accompanied with pursuing a wider angle, and to achieve a longer focal length by securing a significant spacing between the first lens group and the second lens group at the telephoto end.

The second lens group satisfies the condition (1).

Generally, the use of a lens material having a higher refractive index is considered as advantageous in making a lens system smaller. However, using a lens with a material having a higher refractive index in any arbitrary place of the lens system will not necessarily give a satisfactory effect on making it smaller. This invention realizes the most appropriate use condition of high refractivity material to embody a zoom lens with a high changing magnification including a wide angle range, with the sufficient decrease of the maximum total lens length as well as the thickness of each lens group.

For embodying a zoom lens of a high changing magnification including a wide angle range, the configuration of the variator becomes the point. In the zoom lens according to this invention, the second lens group and the third lens group share the changing magnification function; however, the second lens group bears a larger part of the function, and naturally the configuration of the second lens group is very important.

For reducing the maximum total lens length as well as the thickness of each lens group, it is necessary to thin the first lens group with the maximum lens diameter and the second lens group of the highest power of the lens groups, and to reduce the relative movement of the second lens group to the first lens group in changing magnification. In the zoom lens according to this invention, this condition is realized by using a high refractivity material in the second lens group.

In the zoom lens according to this invention, the individual lenses of the second lens group are made up with the materials having refractive indexes within the range satisfying the condition (1) as a whole. Thereby, it is possible to thin the first lens group and the second lens group, and to reduce the relative movement to the first lens group of the second group, and also to sufficiently correct the aberration.

In other words, if the individual lenses of the second lens group are made up with the materials having high refractive indexes within the range satisfying the condition (1) as a whole, it will reduce the quantity of aberration generated on each surface of the lenses; while retaining a high negative power required for the second lens group, it becomes possible to give a higher capability of correcting the aberration to the second lens group; and therefore, it is possible to thin the thickness of the second lens group by appropriating the high capability of correcting the aberration for the degree of freedom in setting the surface spacing.

By the high capability of correcting the aberration given to the second lens group, it becomes possible to intensify the positive power of the first lens group as well as satisfactorily correct the aberration. Since the positive power of the first lens group is intensified in this manner, a desired changing magnification rate can be secured, while reducing the relative movement amount of the first lens group and the second lens group accompanied with changing magnification. Therefore, it is possible to effectively shorten the maximum lens length of the zoom lens by decreasing the spacing between the first lens group and the second lens group at the telephoto end where the total lens length becomes the maximum.

The aperture stop being provided between the second lens group and the third lens group, since the relative movement amount of the first lens group and the second lens group accompanied with changing magnification can be reduced, the distance between the first lens group and the aperture stop at the telephoto end can be reduced. Therefore, it is possible to make smaller the lens diameter of the first lens group, while securing a desired angle of view at the telephoto end. By making the lens diameter smaller, it is possible to thin the thickness of the individual lenses of the first lens group, and to reduce the thickness of the first lens group consequently. Since thickness of the first and the second lens groups can be reduced, the lens size in storage can be reduced.

If the parameter $N_{d2G}$ of the condition (1) is the lower limit 1.90 or less, the condition to the curvature of the lens surface is not sufficiently gentle, and it is difficult to sufficiently correct various types of aberrations in the whole zoom lens while securing the negative power required for the second lens group. On the other hand, if the parameter $N_{d2G}$ is the upper limit 2.10 or more, it will extremely raise the reflectance on the interface between the lens and the air, or the reflectance on the interface between a lens surface and an adhesive in case of a doublet, which makes it easy to generate ghost and flare. It is also possible to apply an anti-reflecting coating to the above interface; however it is not easy to design an effective vapor deposition onto the surface of such a high refractive index that satisfies the condition (1).

If the lower limit of the parameter $N_{d2G}$ of the condition (1) is 1.93 as in the condition (1A), a still smaller in size or a still higher performance in the zoom lens will be realized.

Of the refractive indexes of the lenses configuring the second lens group, preferably the lowest one is 1.85 or more and at least one is 2.00 or more. If this is met, it will configure the second lens group with a fewer number of lenses, which is more advantageous to a thinner zoom lens.

It is extremely preferable to configure the second lens group with three pieces of lenses or less. For sufficiently controlling the variations of image forming performance along with changing magnification, there is a need for the correction of the chromatic aberration and curvature of field of the second lens group by its self; however, to use four pieces of lenses or more for that purpose will make it difficult to thin the second lens group. The second lens group is configured with not more than three pieces of lenses, by an effective disposition of aspheric surfaces in addition to the use of a high refractivity material; thereby, the second lens group can effectively be made thinner.

For more satisfactorily correcting the chromatic aberration in the zoom lens of this invention, the conditions (2A) and (2B) should be satisfied.

If the parameter $\nu_{d2GN}$ of the condition (2A) is 25.0 or less, or if the parameter $\nu_{d2GP}$ of the condition (2B) is 23.0 or more, it will easily lead to an insufficient correction of the chromatic aberration. On the contrary, if the parameter $\nu_{d2GN}$ is 45.0 or more, or if the parameter $\nu_{d2GP}$ is 15.0 or less, it will easily lead to an excessive correction of the chromatic aberration. Both are not preferred.

For still more satisfactorily correcting the chromatic aberration, the condition (3) should be satisfied. The materials of the individual lenses configuring the second lens group should be selected so that the parameter $\nu_{d2GN} - \nu_{d2GP}$ satisfies the condition (3); thereby, the chromatic aberration can be corrected well-balanced throughout the changing magnification range.

If the zoom lens is configured with the fourth lens group having a positive refracting power on the image side of the third lens group, and the focusing to an object within a finite distance is made by a movement of the fourth lens group, the lens group to be moved can be made smaller and lighter in comparison to the configuration wherein the focusing is made by a movement of the first lens group or the second lens group, and the power required for the movement can be reduced, which is advantageous to speeding-up of focusing and saving of power consumption. Further, this configuration makes it easy to dispose an actuator for driving a focusing lens on the rear side of a camera cone unit, which is suitable for making the mechanism smaller. Further, the eye point can be set sufficiently distantly from the image surface, and the matching with an imaging element having micro-lenses to pixels each is satisfactorily attained.

In regard to the movement of the first lens group essential for pursuing a wider angle and a longer focal length, the condition (4) should be satisfied. If the parameter $X_1/f_T$ is the lower limit 0.20 of the condition (4) or less, the contribution to the changing magnification of the second lens group will be decreased; and it will be necessary to increase the load on the third lens group, or to intensify the refracting powers of the first lens group and the second lens group. In any case, it will easily invite deteriorations of various aberrations. The total lens length at the wide angle end also is increased, and the height of rays passing the first lens group is raised, thus resulting in an expanded size of the first lens group.

If the parameter $X_1/f_T$ is the upper limit 0.70 of the condition (4) or more, the total lens length at the wide angle end will become too short, or the total lens length at the telephoto end will become too long. If the total lens length at the wide angle end becomes too short, the movement space of the third lens group will be restricted, and the contribution to the changing magnification of the third lens group will be reduced to make the whole aberration correction difficult.

If the total lens length at the telephoto end becomes too long, it will be not only an obstacle to reducing the total lens length, but also an inducement to expanding the first lens group in the radial direction for acquiring the marginal rays at the telephoto end, or it will easily invite a deterioration of image performance due to manufacturing errors such as an inclination of the camera cone.

It is further preferable that the parameter $X_1/f_T$ of the condition (4) satisfies the following condition (4A).

$$0.25 < X_1/f_T < 0.55. \tag{4A}$$

In regard to the movement of the third lens group, the condition (5) should be satisfied.

If the parameter $X_3/f_T$ of the condition (5) is the lower limit 0.15 or less, the contribution to the changing magnification of the third lens group will be reduced; and it will be necessary to increase the load of the second lens group, or to intensify the refracting power of the third lens group itself. In any case, it will easily invite deteriorations of various aberrations. If the parameter $X_3/f_T$ is over the upper limit 0.40 or more, the total lens length at the wide angle end will be increased, and the height of rays passing the first lens group will be raised, which will easily invites an expanded size of the first lens group.

It is further preferable that the parameter $X_3/f_T$ of the condition (5) satisfies the following condition (5A).

$$0.20 < X_3/f_T < 0.35 \tag{5A}$$

From the viewpoint of aberration correction, the refracting power of each lens group preferably satisfies the conditions (6) and (7).

If the parameter $|f_2|/f_3$ of the condition (6) is the lower limit 0.45 or less, the refracting power of the second lens group will be intensified excessively. If it is the upper limit 0.85 or more, the refracting power of the third lens group will be intensified excessively. In any case, aberration fluctuations in the changing magnification are likely to increase.

If the parameter $f_1/f_w$ of the condition (7) is the lower limit 5.0 or less, the image forming power of the second lens group will approximate to an equal magnification to increase the efficiency of the changing magnification, which is advantageous to a higher changing magnification. However, each of the lenses configuring the first lens group has to have a high refracting power, and this leads to a harmful effect, especially a deterioration of the chromatic aberration at the telephoto end. It also leads to an increased thickness and a larger aperture of the first lens group, which is disadvantageous to a smaller size, especially, in storage. If the parameter $f_1/f_w$ is the upper limit 11.0 of the condition (7) or more, the contribution to the changing magnification of the second lens group will be reduced, which makes it difficult to raise the changing magnification.

Further, the parameter $f_1/f_w$ of the condition (7) preferably satisfies the following condition (7A).

$$5.0 < f_1/f_w < 8.0, \tag{7A}$$

wherein $f_w$ is a focal length of the whole system at the wide angle end.

In the zoom lens of this invention, an aperture stop is disposed between the second lens group and the third lens group, and the aperture stop can be moved independently from the adjoining lens groups (second lens group and third lens group) in changing magnification. This configuration makes it possible to select the most appropriate path of rays at any position in a range of a high changing magnification rate 6.5 or more. Thereby, it becomes possible to raise the degree of freedom for correcting especially the coma aberration and the curvature of field and so forth, and to enhance off-axis performances.

The spacing between the aperture stop and the third lens group is preferably wider at the wide angle end than at the telephoto end. Thus, it becomes possible to dispose the aperture stop closer to the first lens group at the wide angle end, and to further lower the height of rays passing the first lens group, which realizes a still smaller size of the first lens group and the second lens group. If the spacing between the aperture stop and the third lens group is made wider at the wide angle end than at the telephoto end, it is preferable that an axial spacing $d_{SW}$ between the aperture stop at the wide angle end and the surface on the most object side of the third lens group satisfies the following condition (8) to the focal length $f_T$ at the telephoto end.

$$0.03 < d_{SW}/f_T < 0.20 \quad (8)$$

If the parameter $d_{SW}/f_T$ is the lower limit 0.03 of the condition (8) or less, the height of rays passing the first lens group at the wide angle end will be raised, which easily invites an increased size of the first lens group and the second lens group. Eventually, the increase in the lens diameter increases the thickness in the optical axis direction.

If the parameter $d_{SW}/f_T$ is the upper limit 0.20 or more, the height of rays passing the third lens group will be raised at the wide angle end; and the image surface will excessively be inclined or a barrel-shaped distortion will be increased, which makes it difficult to secure the performance especially in a wide angle range.

With regard to the locus of movement of each lens group in changing magnification, the first lens group and the third lens group preferably move monotonously. The second lens group can be fixed; however for a smaller size, the second lens group preferably moves so as to be located on the image side at the telephoto end rather than at the wide angle end. In this case, the second lens group can move along a convex locus to the image side. And, the fourth lens group preferably moves in a manner that the spacing between the third lens group and the fourth lens group increases at the telephoto end rather than at the wide angle end. In this case, the fourth lens group can move along a convex locus to the object side.

The first lens group is preferably configured with at least a piece of negative lens and at least a piece of positive lens, in order from the object side. More specifically, it is preferably configured with two pieces of, in order from the object side, a negative meniscus lens with a convex surface facing toward the object side and a positive lens with a strong convex surface facing toward the object side, or it is preferably configured with three pieces of, in order from the object side, a negative meniscus lens with a convex surface facing toward the object side, a positive lens with a strong convex surface facing toward the object side, and a positive lens with a strong convex surface facing toward the object side.

In order for pursuing a higher changing magnification, especially for elongating the focal length at the telephoto end, the composite power by the second lens group, the third lens group, and the fourth lens group at the telephoto end has to be increased; to that degree, the aberration generated by the first lens group is expanded on the image surface. Accordingly, it is necessary to sufficiently reduce the aberration generated by the first lens group in order for seeking a higher changing magnification; and it is preferable to apply the above configuration to the first lens group.

The second lens group is preferably configured with three pieces of, in order from the object side, a negative lens with a surface of large curvature facing toward the image side, a positive lens with a surface of large curvature facing toward the image side, and a negative lens with a surface of large curvature facing toward the object side.

In case of configuring a changing magnification lens group having a negative refracting power with three pieces of lenses, there is a well-known method of placing a negative lens, a negative lens, and a positive lens in order from the object side. However, in comparison with this configuration, the above configuration of negative/positive/negative excels in the capability of correcting the power chromatic aberration accompanied with pursuing a wider angle. Here, the second lens and the third lens from the object side may be united appropriately. Here, in case there is a united place in the second lens group, there is a large difference between the refractive indexes of the lens material and the adhesive, and the reflectance becomes high to easily generate ghost and flare; therefore, it is preferable to apply an anti-reflecting coating to the optical surfaces mutually adhered.

The third lens group is preferably configured with three pieces of, in order from the object side, a positive lens, a positive lens, and a negative lens. Here, the second lens and the third lens from the object side may be united appropriately.

The aspheric surface is essential for seeking a still smaller size while maintaining a satisfactory correction of aberrations. It is preferable that at least the second lens group and the third lens group each have one or more aspheric surfaces. Especially in the second lens group, to apply aspheric surfaces to both of the surface on the most object side and the surface on the most image side will achieve a high effect of correcting a distortion and astigmatism, etc., which are likely to increase accompanied with pursuing a wider angle.

As an aspheric lens, the following can be used: lenses molded out of an optical glass and an optical plastic (glass mold aspheric lens, plastic mold aspheric lens), and a lens wherein a thin resin layer is formed on the plane of a glass lens, and the surface of the resin layer is made aspheric (referred to as a hybrid aspheric lens, or a replica aspheric lens). In case such a hybrid aspheric lens is used in the second lens group, it is assumed that the refractive indexes and the Abbe numbers of the lenses configuring the second lens group are considered in disregard of the thin resin layer.

It is preferable to make the open diameter of an aperture stop constant regardless of the changing magnification, for a mechanical simplicity. However, by increasing the open diameter at the longer focus end in comparison to that at the shorter focus end, it is possible to decrease the variations of F number accompanied with the changing magnification. And when the quantity of light reaching the image surface has to be decreased, the diameter of the aperture stop may be decreased; however, it is preferable to decrease the quantity of light by inserting an ND filter or the like, without a remarkable change of the diameter of the aperture stop, which can prevent a resolving power from lowering due to the diffraction phenomena.

As being described above, a smaller-size and higher-performance zoom lens can be realized according to this invention. The zoom lens of this invention, as described in the following embodiments, achieves the half angle of view at the wide angle end 38 degrees or more, the changing magnification rate 6.5 or more, and the resolving power equivalent to an imaging element of 5-8 million pixels, in a state that both the maximum total lens length and the thickness of each lens group are sufficiently reduced.

The following are the descriptions to the configurations that embody the invention.

FIG. 1 is a drawing explaining one configuration that embodies the zoom lens of the invention. This drawing corresponds to the embodiment 1 described later.

The zoom lens in FIG. 1 includes, in order from the object side (left in the drawing), a first lend group I having a positive refracting power, a second lend group II having a negative refracting power, a third lend group III having a positive refracting power, a fourth lend group IV having a positive refracting power, and an aperture stop S between the second lend group II and the third lend group III. Here, in changing magnification from the wide angle end (the uppermost drawing in FIG. 1) toward the telephoto end (the lowest drawing in FIG. 1), at least the first lend group I and the third lend group III move toward the object side in a manner that the spacing between the first lend group I and the second lend group II increases and the spacing between the second lend group II and the third lend group III decreases. As shown in the embodiment 1 described later, the average $N_{d2G}$ of the refractive indexes in the d-lines of the individual lenses configuring the second lens group II satisfies the condition (1).

Figure 2:
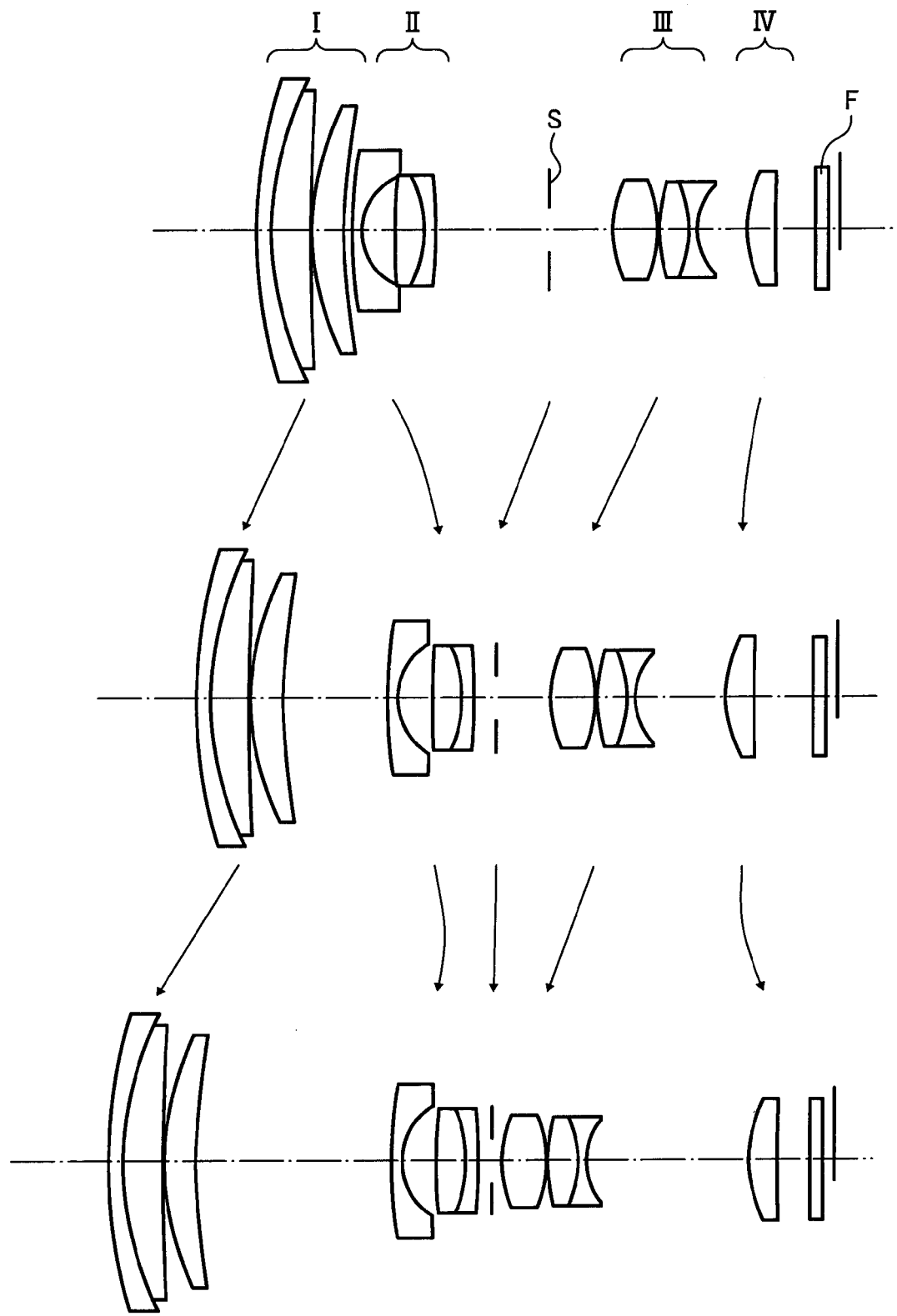
FIG. 2 is a drawing illustrating the configuration of a zoom lens and the movement along with changing magnification in the embodiment 2.

FIG. 2 is a drawing explaining another configuration that embodies the zoom lens of the invention. This drawing corresponds to the embodiment 2 described later.

The zoom lens in FIG. 2 includes, in order from the object side (left in the drawing), a first lend group I having a positive refracting power, a second lend group II having a negative refracting power, a third lend group III having a positive refracting power, a fourth lend group IV having a positive refracting power, and an aperture stop S between the second lend group II and the third lend group III. Here, in changing magnification from the wide angle end (the uppermost drawing in FIG. 2) toward the telephoto end (the lowest drawing in FIG. 2), at least the first lend group I and the third lend group III move toward the object side in a manner that the spacing between the first lend group I and the second lend group II increases and the spacing between the second lend group II and the third lend group III decreases. As shown in the embodiment 2 described later, the average $N_{d2G}$ of the refractive indexes in the d-lines of the individual lenses configuring the second lens group II satisfies the condition (1).

Figure 3:
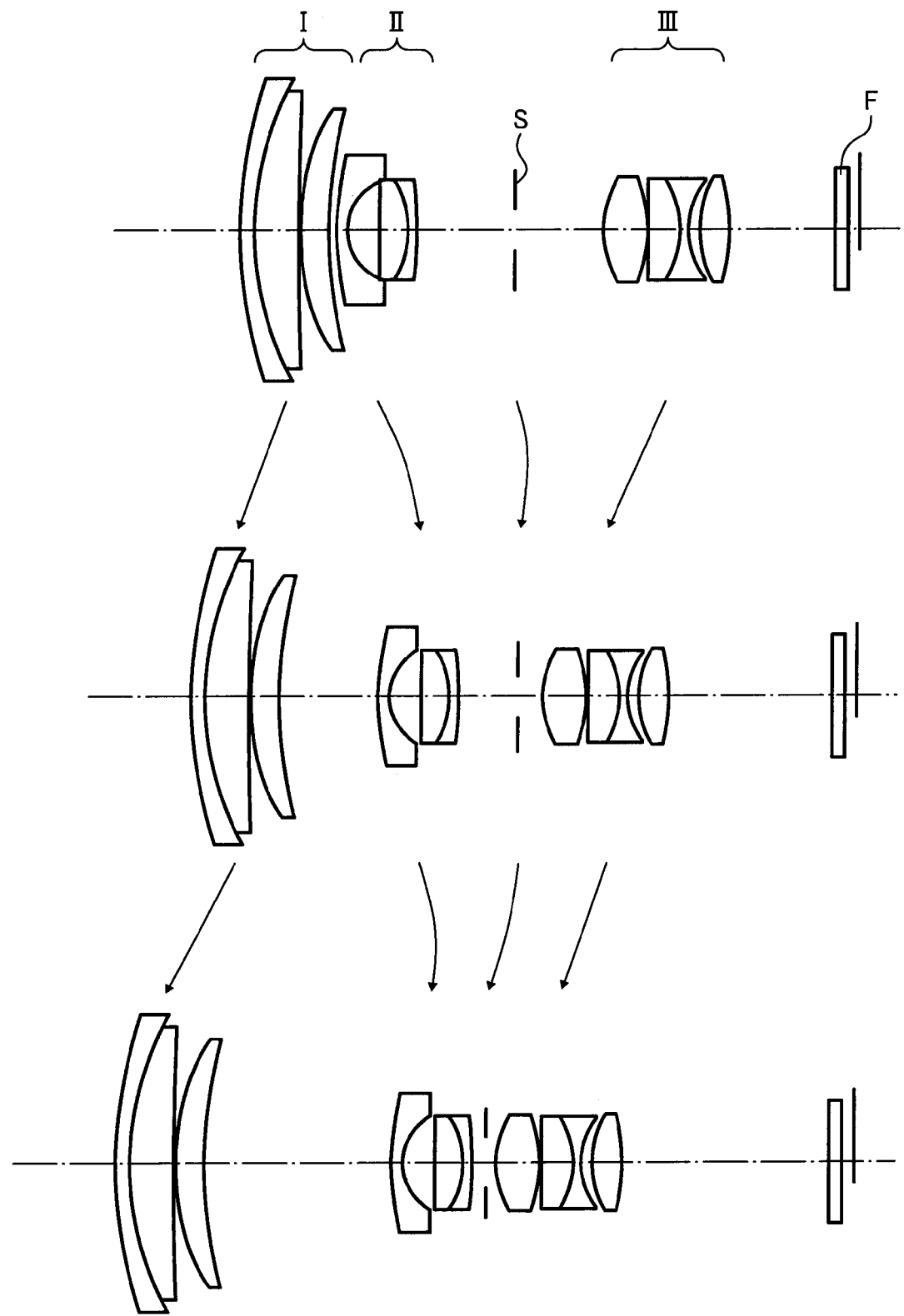
FIG. 3 is a drawing illustrating the configuration of a zoom lens and the movement along with changing magnification in the embodiment 3.

FIG. 3 is a drawing explaining another configuration that embodies the zoom lens of the invention. This drawing corresponds to the embodiment 3 described later.

The zoom lens in FIG. 3 includes, in order from the object side (left in the drawing), a first lend group I having a positive refracting power, a second lend group II having a negative refracting power, a third lend group III having a positive refracting power, and an aperture stop S between the second lend group II and the third lend group III. Here, in changing magnification from the wide angle end (the uppermost drawing in FIG. 3) toward the telephoto end (the lowest drawing in FIG. 3), at least the first lend group I and the third lend group III move toward the object side in a manner that the spacing between the first lend group I and the second lend group II increases and the spacing between the second lend group II and the third lend group III decreases. As shown in the embodiment 3 described later, the average $N_{d2G}$ of the refractive indexes in the d-lines of the individual lenses configuring the second lens group II satisfies the condition (1).

Figure 4:
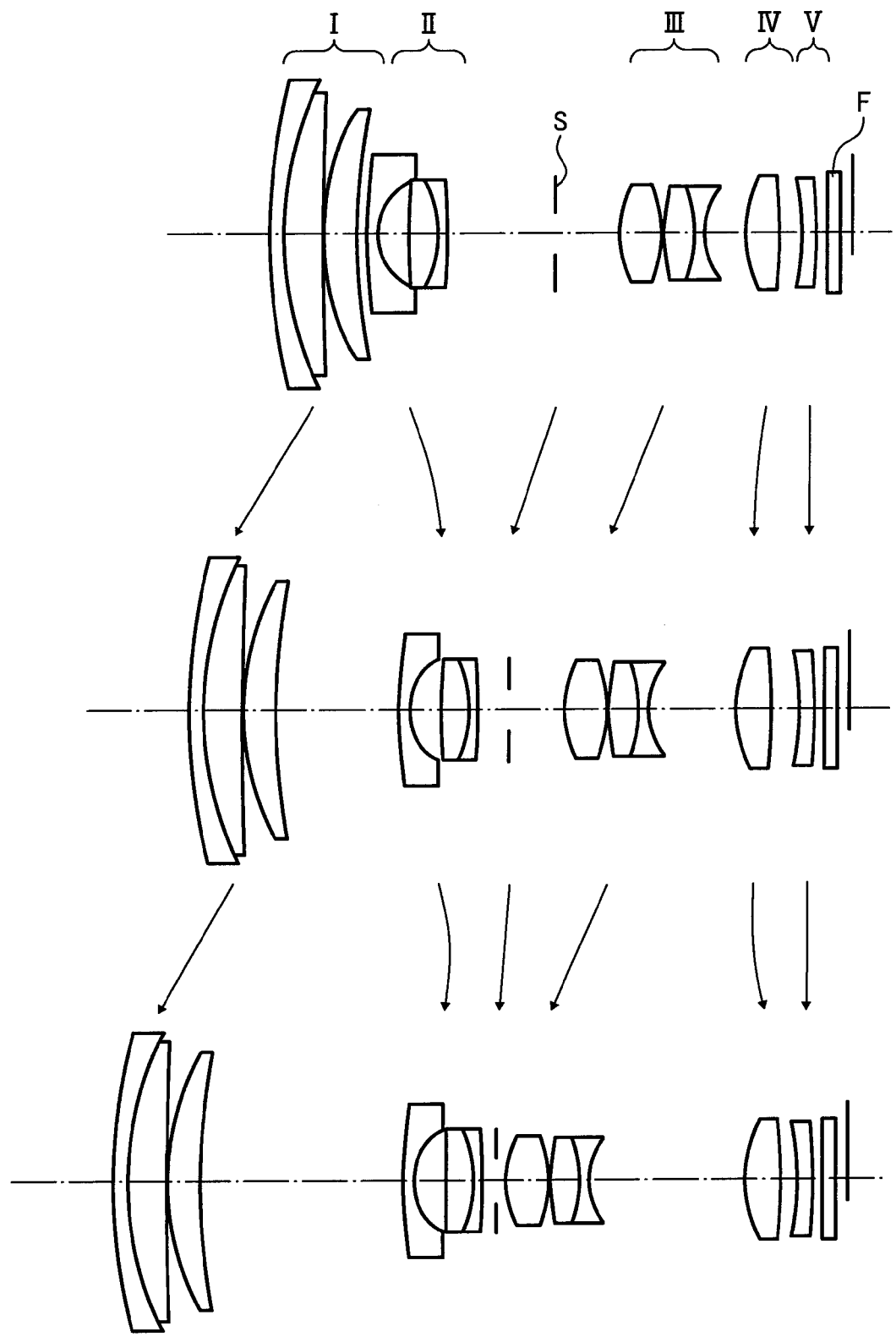
FIG. 4 is a drawing illustrating the configuration of a zoom lens and the movement along with changing magnification in the embodiment 4.

FIG. 4 is a drawing explaining another configuration that embodies the zoom lens of the invention. This drawing corresponds to the embodiment 4 described later.

The zoom lens in FIG. 4 includes, in order from the object side (left in the drawing), a first lend group I having a positive refracting power, a second lend group II having a negative refracting power, a third lend group III having a positive refracting power, a fourth lend group IV having a positive refracting power, a fifth lend group V having a positive refracting power subsequent to the fourth, and an aperture stop S between the second lend group II and the third lend group III. Here, in changing magnification from the wide angle end (the uppermost drawing in FIG. 4) toward the telephoto end (the lowest drawing in FIG. 4), at least the first lend group I and the third lend group III move toward the object side in a manner that the spacing between the first lend group I and the second lend group II increases and the spacing between the second lend group II and the third lend group III decreases. As shown in the embodiment 4 described later, the average $N_{d2G}$ of the refractive indexes in the d-lines of the individual lenses configuring the second lens group II satisfies the condition (1).

In the configurations in FIG. 1 and FIG. 2, the zoom lens is configured with the four lens groups; in the configuration in FIG. 3, the zoom lens is configured with the three lens groups; and in the configuration in FIG. 4, the zoom lens is configured with the five lens groups.

In the above configurations, the zoom lens in FIG. 1 through FIG. 3 uses ten pieces of lenses, and the zoom lens in FIG. 4 uses eleven pieces; any of them does not exceed twelve pieces.

The parallel plate denoted by the symbol F in FIG. 1 through FIG. 4 represents a cover glass (seal glass) of a light-receiving element, such as various filters of an optical low-pass filter and infrared cut filter and a CCD sensor, which is illustrated in a single parallel plate.

Before listing concrete examples of the zoom lens, one configuration of a personal digital assistant according to an embodiment of the present invention will be described first.

Figure 17A:
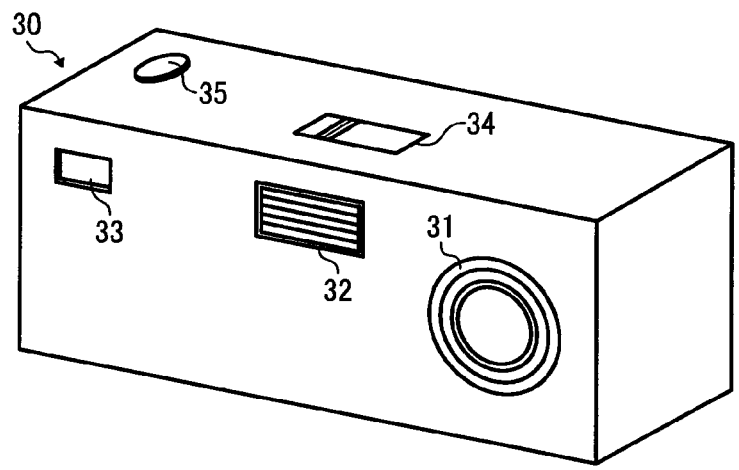
FIG. 17A is a squint-eyed drawing explaining one embodiment of a personal digital assistant wherein the photographing lens is in a collapsed state, viewed from the lens side.
Figure 17B:
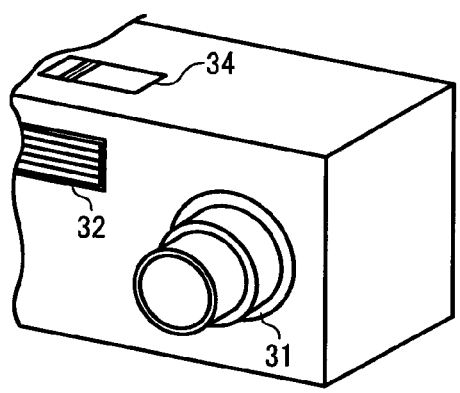
FIG. 17B is a squint-eyed drawing explaining one embodiment of the personal digital assistant wherein the camera cone is pulled out, viewed from the lens side.
Figure 17C:
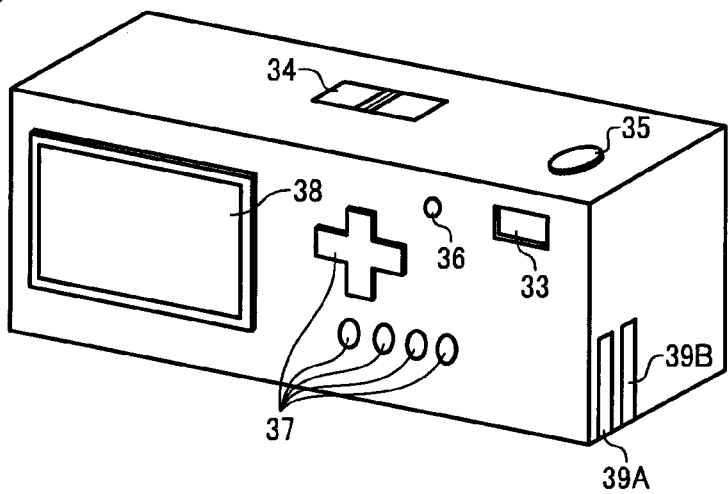
FIG. 17C is a squint-eyed drawing explaining embodiment of the personal digital assistant, viewed from the finder side.
Figure 18:
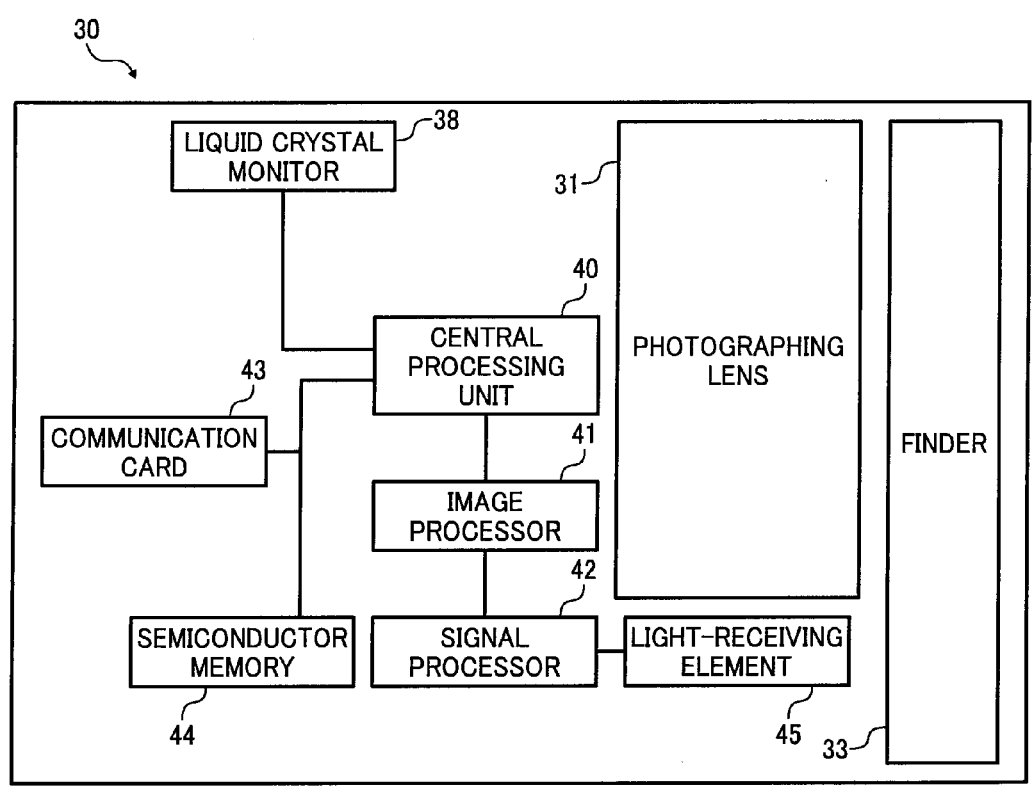
FIG. 18 is a drawing explaining the system of the device illustrated in FIG. 17.

As shown in FIG. 17 and FIG. 18, a personal digital assistant 30 includes a photographing lens 31 and a light-receiving element (area sensor) 45 being an imaging element. Here, the personal digital assistant 30 is configured such that the image of photographing object by the photographing lens 31 is formed on the light-receiving element 45, and the image formed thereon is read by the light-receiving element 45.

The photographing lens 31 and the light-receiving element 45 constitute an imaging device. The light-receiving element 45 is a color imaging element.

The photographing lens 31 is used as the zoom lens according to the embodiment of the present invention. Concretely, any one of the embodiment 1 through the embodiment 4 described later is used as one example. As the light-receiving element 45 can be used one having 5-8 million pixels or more, for example, a CCD area sensor having the diagonal length 9.1 mm of light-receiving area, the pixel pitch 2.35 μm, and the pixel number of about 7 million, or a CCD area sensor having the diagonal length 9.1 mm of light-receiving area, the pixel pitch 2 μm, and the pixel number of about 10 million.

As shown in FIG. 18, the output from the light-receiving element 45 is processed and converted into digital information by a signal processor 42 controlled by a central processing unit 40. The image information converted into digital information by the signal processor 42 experiences a predetermined image processing in an image processor 41 controlled by a central processing unit 40, and the resultant information is recorded in a semiconductor memory 44. A liquid crystal monitor 38 can display an image now being photographed as well as an image being recorded in the semiconductor memory 44. It is also possible to transmit the image information recorded in the semiconductor memory 44 to the outside, by means of a communication card 43 or the like.

As shown in FIG. 17A, the photographing lens 31 is in a collapsed state while a user carries the device; as the user powers it by operating a power switch 36, as illustrated in FIG. 17B, the camera cone is pulled out. At this moment, each lens group of the zoom lens assumes, for example, the configuration at the short focus end inside the camera cone; if the user operates a zoom lever 34, it will vary the configuration of each lens group, and the user can vary the power can toward the long focus end. Here, a finder 33 interlocks with the variation of field angle of the photographing lens 31 to change magnification.

A half-pressing of a shutter button 35 will make a focusing. In case of using the zoom lens in the embodiment 1 through the embodiment 4, the focusing is made by the movement of the second lens group (embodiment 3) or the fourth lens group (embodiment 1, 2, 4), or by the movement of the light-receiving element 45. Further pressing the shutter button 35 will perform a photographing; thereafter, the above image information processing is performed. The symbol 32 denotes a flash-gun.

For displaying the image recorded in the semiconductor memory 44 on the liquid crystal monitor 38, or for transmitting it to the outside by means of the communication card 43, the user operates operation buttons 37 illustrated in FIG. 17C. When using the semiconductor memory 44 and the communication card 43, etc., the user inserts them into the dedicated or universal slots 39A, 39B.

When the photographing lens 31 is in a collapsed sate, each lens group of the zoom lens is not necessarily placed in a row on the optical axis. If a mechanism is made to evacuate the third lens group and the fourth lens group, or the fifth lens group from the optical axis and store them in parallel to the other lens groups, a still thinner personal digital assistant will be realized. The zoom lens of this invention reduces the thickness of the first lens group and the second lens group; and the storage system of evacuating the lens groups following the aperture stop from the optical axis is advantageous to making the body still thinner.

EMBODIMENTS

The embodiments of the zoom lens of this invention will be described with four concrete examples. In all of the embodiments, the maximum height of image is 3.70 mm.

The embodiment 1 and the embodiment 2 assume the four group configuration of positive/negative/positive/positive. The embodiment 3 assumes the three group configuration of positive/negative/positive. And the embodiment 4 assumes the five group configuration of positive/negative/positive/positive/negative. As already mentioned, the parallel plate disposed on the most image surface side of the lens system in each embodiment is assumedly a cover glass (seal glass) of a light-receiving element, such as various filters of an optical low-pass filter and infrared cut filter, etc, and a CCD sensor.

The material of the lens is an optical glass, except that the positive lens of the fourth lens group in the embodiments 1, 2 and 4 is an optical plastic.

In each embodiment, the symbols and the meanings thereof are as follows.

f: focal length of the whole system
F: F number
ω: half angle of view
R: curvature radius
D: inter-facial spacing
$N_d$: refractive index
$v_d$: Abbe number
K: conic constant of an aspheric surface
$A_4$: fourth order aspheric coefficient
$A_6$: sixth order aspheric coefficient
$A_8$: eighth order aspheric coefficient
$A_{10}$: tenth order aspheric coefficient The shape of the aspheric surface is given by the following well-known formula.

$$X = CH^2/[1+\infty\{1-(1+K)C^2H^2\}] + A_4 \cdot H^4 + A_6 \cdot H^6 + A_8 \cdot H^8 + A_{10} \cdot H^{10}$$

Here, C is the inverse number of paraxial curvature radius (paraxial curvature), H is the height from the optical axis, and K is the conic constant. Giving the values of C, K, and $A_4$, $A_6$, $A_8$, $A_{10}$ will specify the shape of the aspheric surface.

Embodiment 1
f = 4.75-32.4, F = 3.46-5.63, ω = 39.10-6.33

| Surface No | R | D | $N_d$ | $v_d$ | Name of Glass Type |
|---|---|---|---|---|---|
| 01 | 30.993 | 1.00 | 1.92286 | 18.90 | OHARA S-NPH2 |
| 02 | 21.344 | 2.74 | 1.60300 | 65.44 | OHARA S-PHM53 |
| 03 | 87.386 | 0.10 | | | |
| 04 | 21.269 | 2.21 | 1.80400 | 46.57 | OHARA S-LAH65 |
| 05 | 58.418 | Variable (A) | | | |
| 06* | 41.530 | 0.74 | 2.00330 | 28.27 | OHARA S-LAH79 |
| 07 | 4.608 | 2.11 | | | |
| 08 | 34.167 | 2.66 | 1.92286 | 18.90 | OHARA S-NPH2 |
| 09 | −6.211 | 0.64 | 2.00330 | 28.27 | OHARA S-LAH79 |
| 10* | −90.113 | Variable (B) | | | |
| 11 | Aperture Stop | Variable (C) | | | |
| 12* | 6.901 | 3.49 | 1.58913 | 61.15 | OHARA L-BAL35 |
| 13* | −8.509 | 0.10 | | | |
| 14 | 9.619 | 2.08 | 1.60300 | 65.44 | OHARA S-PHM53 |
| 15 | −8.862 | 0.60 | 1.71736 | 29.52 | OHARA S-TIH1 |
| 16 | 4.573 | Variable (D) | | | |
| 17* | 8.865 | 1.82 | 1.52470 | 56.20 | Optical Plastic |
| 18 | 37.105 | Variable (E) | | | |
| 19 | ∞ | 0.90 | 1.51680 | 64.20 | Various Filter |
| 20 | ∞ | | | | |

Aspheric surface (surface with the mark* added)

The sixth surface

K = 0.0, $A_4$ = 8.47379 × 10$^{-5}$, $A_6$ = −2.79405 × 10$^{-8}$, $A_8$ = −5.56153 × 10$^{-8}$, $A_{10}$ = 6.07891 × 10$^{-10}$

The tenth surface

K = 0.0, $A_4$ = −4.13377 × 10$^{-4}$, $A_6$ = 2.74952 × 10$^{-6}$, $A_8$ = −7.87033 × 10$^{-7}$, $A_{10}$ = −8.80974 × 10$^{-9}$

The twelfth surface

K = 0.0, $A_4$ = −9.16743 × 10$^{-4}$, $A_6$ = 2.27230 × 10$^{-6}$, $A_8$ = −9.38276 × 10$^{-7}$, $A_{10}$ = −3.53658 × 10$^{-8}$

The thirteenth surface

K = 0.0, $A_4$ = 2.65626 × 10$^{-4}$, $A_6$ = −6.98239 × 10$^{-7}$, $A_8$ = −6.41674 × 10$^{-7}$, $A_{10}$ = −3.33711 × 10$^{-8}$

The seventeenth surface

K = 0.0, $A_4$ = −9.63369 × 10$^{-5}$, $A_6$ = 1.05145 × 10$^{-5}$, $A_8$ = −4.53299 × 10$^{-7}$, $A_{10}$ = 1.06241 × 10$^{-8}$

| Variables | | | |
|---|---|---|---|
| | Short Focus End f = 4.747 | Medium Focal Length f = 12.360 | Long Focus End f = 32.412 |
| A | 0.600 | 8.606 | 15.077 |
| B | 8.733 | 2.008 | 1.000 |
| C | 4.009 | 3.780 | 0.550 |
| D | 3.194 | 5.413 | 10.881 |
| E | 2.895 | 4.122 | 2.250 |

The parameter values on the conditions $N_{d2G}$ = 1.976
$v_{d2GN}$ = 28.27
$v_{d2G}$ = 18.90
$v_{d2GN} - v_{d2GP}$ = 9.37
$X_1/f_T$ = 0.319
$X_3/f_T$ = 0.217
$|f_2|/f_3$ = 0.694
$f_1/f_w$ = 6.54
$d_{sw}/f_T$ = 0.124

Figure 5:
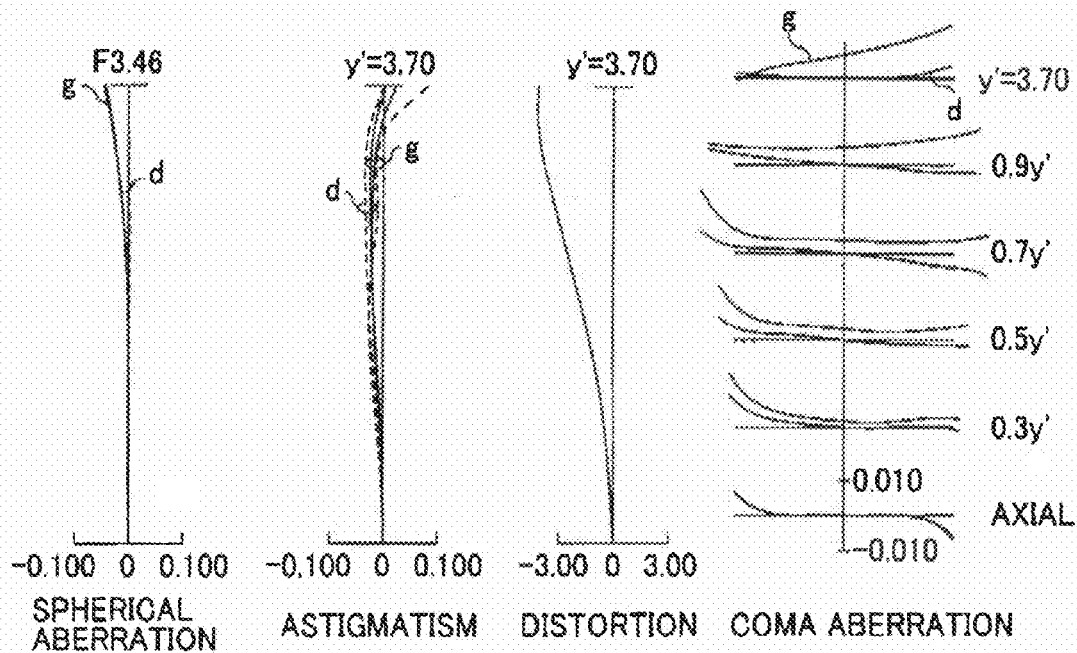
FIG. 5 is a drawing illustrating the aberration at the short focus end in the embodiment 1.
Figure 6:
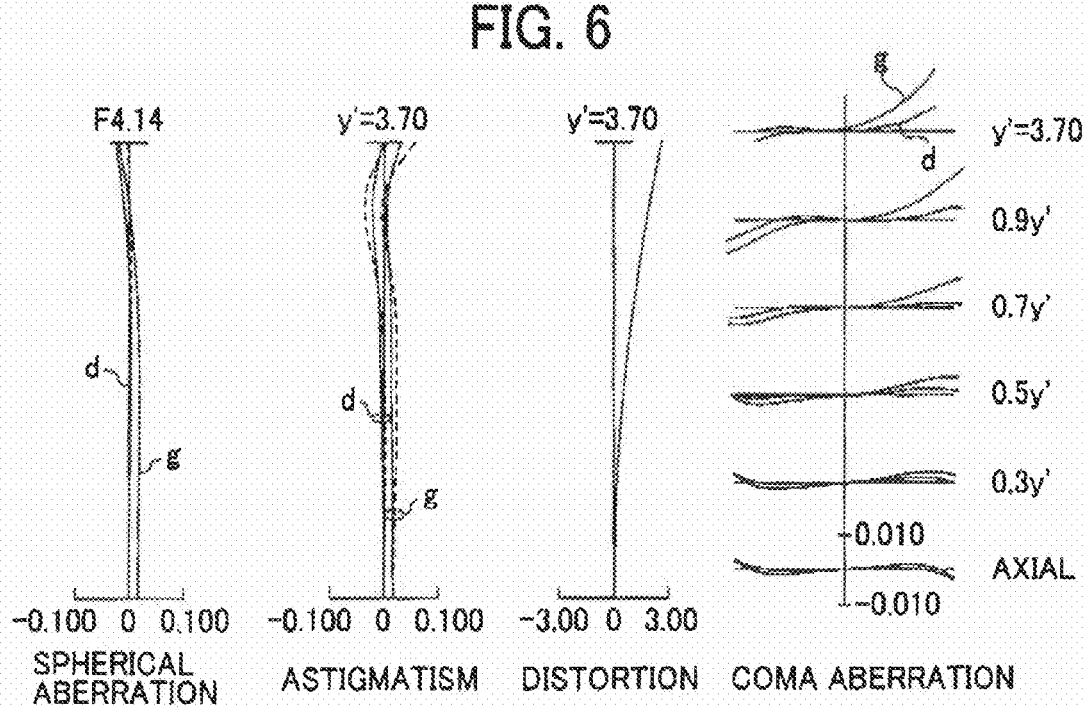
FIG. 6 is a drawing illustrating the aberration at the medium focal length in the embodiment 1.

In the above table, the name of nitrate species represents the product name. It is the same with the following embodiments. FIG. 5 through FIG. 7 illustrates the aberrations in relation to the embodiment 1. FIG. 5 illustrates the aberration at the short focus end, FIG. 6 illustrates the aberration at the medium focal length, and FIG. 7 illustrates the aberration at the long focus end. Here, the dotted line in the drawing of the spherical aberration shows the sine condition. The solid line in the drawing of the astigmatism shows the sagittal astigmatism, and dotted line shows the meridional astigmatism. In the drawings of the aberrations in the other embodiments, the above are the same.

Embodiment 2
f = 4.74-31.9, F = 3.51-5.58, ω = 39.19-6.48

| Surface No | R | D | $N_d$ | $v_d$ | Name of Glass Type |
|---|---|---|---|---|---|
| 01 | 36.647 | 1.00 | 1.92286 | 18.90 | OHARA S-NPH2 |
| 02 | 23.427 | 2.74 | 1.60300 | 65.44 | OHARA S-PHM53 |
| 03 | 170.952 | 0.10 | | | |
| 04 | 18.584 | 2.31 | 1.77250 | 49.60 | OHARA S-LAH66 |
| 05 | 47.492 | Variable (A) | | | |
| 06* | 39.987 | 0.74 | 1.88300 | 40.76 | OHARA S-LAH58 |
| 07 | 4.234 | 2.32 | | | |
| 08 | 54.221 | 2.05 | 1.92286 | 18.90 | OHARA S-NPH2 |
| 09 | −9.272 | 0.84 | 2.00330 | 28.27 | OHARA S-LAH79 |
| 10* | −116.917 | Variable (B) | | | |
| 11 | Aperture Stop | Variable (C) | | | |
| 12* | 6.918 | 3.21 | 1.58913 | 61.15 | OHARA L-BAL35 |
| 13* | −8.678 | 0.10 | | | |
| 14 | 11.511 | 2.18 | 1.60300 | 65.44 | OHARA S-PHM53 |
| 15 | −7.770 | 0.60 | 1.68893 | 31.07 | OHARA S-TIM28 |
| 16 | 4.825 | Variable (D) | | | |
| 17* | 9.227 | 2.02 | 1.52470 | 56.20 | Optical Plastic |
| 18 | 158.590 | Variable (E) | | | |
| 19 | ∞ | 0.90 | 1.51680 | 64.20 | Various Filter |
| 20 | ∞ | | | | |

Aspheric surface

The sixth surface $K = 0.0, A_4 = 5.31992 \times 10^{-5}, A_6 = 2.13225 \times 10^{-7},$
$A_8 = -6.80433 \times 10^{-8}, A_{10} = 9.10866 \times 10^{-10}$ The tenth surface $K = 0.0, A_4 = -4.66740 \times 10^{-4}, A_6 = -3.74622 \times 10^{-7},$
$A_8 = -7.91115 \times 10^{-7}, A_{10} = -2.92852 \times 10^{-8}$ The twelfth surface $K = 0.0, A_4 = -8.82834 \times 10^{-4}, A_6 = -8.96856 \times 10^{-7},$
$A_8 = -4.79181 \times 10^{-8}, A_{10} = -7.50342 \times 10^{-8}$ The thirteenth surface $K = 0.0, A_4 = 3.01624 \times 10^{-4}, A_6 = -4.31357 \times 10^{-6},$
$A_8 = 1.38650 \times 10^{-7}, A_{10} = -6.81860 \times 10^{-8}$ The seventeenth surface $K = 0.0, A_4 = -6.18571 \times 10^{-5}, A_6 = 7.90738 \times 10^{-6},$
$A_8 = -3.31121 \times 10^{-7}, A_{10} = 7.16443 \times 10^{-9}$

| Variables | | | |
|---|---|---|---|
| | Short Focus End f = 4.741 | Medium Focal Length f = 12.319 | Long Focus End f = 31.905 |
| A | 0.600 | 7.561 | 14.139 |
| B | 8.107 | 1.621 | 1.000 |
| C | 4.464 | 3.819 | 0.650 |
| D | 3.496 | 6.384 | 11.507 |
| E | 2.855 | 4.192 | 2.352 |

The parameter values on the conditions $N_{d2G} = 1.936$
$v_{d2GN} = 34.52$

-continued

Embodiment 2
f = 4.74-31.9, F = 3.51-5.58, ω = 39.19-6.48

$v_{d2G} = 18.90$
$v_{d2GN} - v_{d2GP} = 15.62$
$X_1/f_T = 0.317$
$X_3/f_T = 0.235$
$|f_2|/f_3 = 0.664$
$f_1/f_w = 6.25$
$d_{sw}/f_T = 0.140$

FIG. 8 through FIG. 10 illustrates the aberrations in relation to the embodiment 2. FIG. 8 illustrates the aberration at the short focus end, FIG. 9 illustrates the aberration at the medium focal length, and FIG. 10 illustrates the aberration at the long focus end.

Embodiment 3
f = 4.74-31.93, F = 3.50-5.60, ω = 39.15-6.61

| Surface No | R | D | $N_d$ | $v_d$ | Name of Glass Type |
|---|---|---|---|---|---|
| 01 | 33.024 | 1.00 | 1.92286 | 18.90 | OHARA S-NPH2 |
| 02 | 21.553 | 3.05 | 1.60300 | 65.44 | OHARA S-PHM53 |
| 03 | 216.852 | 0.10 | | | |
| 04 | 16.154 | 2.12 | 1.77250 | 49.60 | OHARA S-LAH66 |
| 05 | 32.210 | Variable (A) | | | |
| 06* | 22.714 | 0.74 | 1.88300 | 40.76 | OHARA S-LAH58 |
| 07 | 3.740 | 2.23 | | | |
| 08 | 118.867 | 2.02 | 1.92286 | 18.90 | OHARA S-NPH2 |
| 09 | −6.916 | 0.64 | 2.00330 | 28.27 | OHARA S-LAH79 |
| 10* | −147.074 | Variable (B) | | | |
| 11 | Aperture Stop | Variable (C) | | | |
| 12* | 6.119 | 3.11 | 1.58913 | 61.15 | OHARA L-BAL35 |
| 13* | −9.815 | 0.10 | | | |
| 14 | 212.627 | 2.26 | 1.60300 | 65.44 | OHARA S-PHM53 |
| 15 | −6.580 | 0.60 | 1.74950 | 35.28 | OHARA S-LAM7 |
| 16 | 5.405 | 0.77 | | | |
| 17* | 7.011 | 2.11 | 1.51633 | 64.14 | OHARA S-BSL7 |
| 18 | −14.308 | Variable (D) | | | |
| 19 | ∞ | 0.90 | 1.51680 | 64.20 | Various Filter |
| 20 | ∞ | | | | |

Aspheric surface

The sixth surface $K = 0.0, A_4 = -1.39130 \times 10^{-5}, A_6 = 1.07909 \times 10^{-6},$
$A_8 = -9.56988 \times 10^{-8}, A_{10} = 1.01099 \times 10^{-9}$ The tenth surface $K = 0.0, A_4 = -6.53461 \times 10^{-4}, A_6 = -6.32795 \times 10^{-6},$
$A_8 = -1.30334 \times 10^{-6}, A_{10} = -7.51258 \times 10^{-8}$ The twelfth surface $K = 0.0, A_4 = -7.01992 \times 10^{-4}, A_6 = -7.85945 \times 10^{-6},$
$A_8 = 6.92903 \times 10^{-7}, A_{10} = -9.48794 \times 10^{-8}$ The thirteenth surface $K = 0.0, A_4 = 2.91193 \times 10^{-4}, A_6 = 1.44347 \times 10^{-6},$
$A_8 = 2.75419 \times 10^{-7}, A_{10} = -7.93114 \times 10^{-8}$ -continued Embodiment 3
f = 4.74-31.93, F = 3.50-5.60, ω = 39.15-6.61

The seventeenth surface $K = 0.0, A_4 = -3.23395 \times 10^{-4}, A_6 = -3.74585 \times 10^{-6},$
$A_8 = 5.42386 \times 10^{-7}, A_{10} = -1.33173 \times 10^{-8}$ Variables

|   | Short Focus End f = 4.739 | Medium Focal Length f = 12.319 | Long Focus End f = 31.926 |
|---|---|---|---|
| A | 0.600 | 6.953 | 13.174 |
| B | 6.892 | 4.227 | 1.000 |
| C | 6.193 | 1.668 | 0.650 |
| D | 7.514 | 11.575 | 14.663 |

Figure 11:
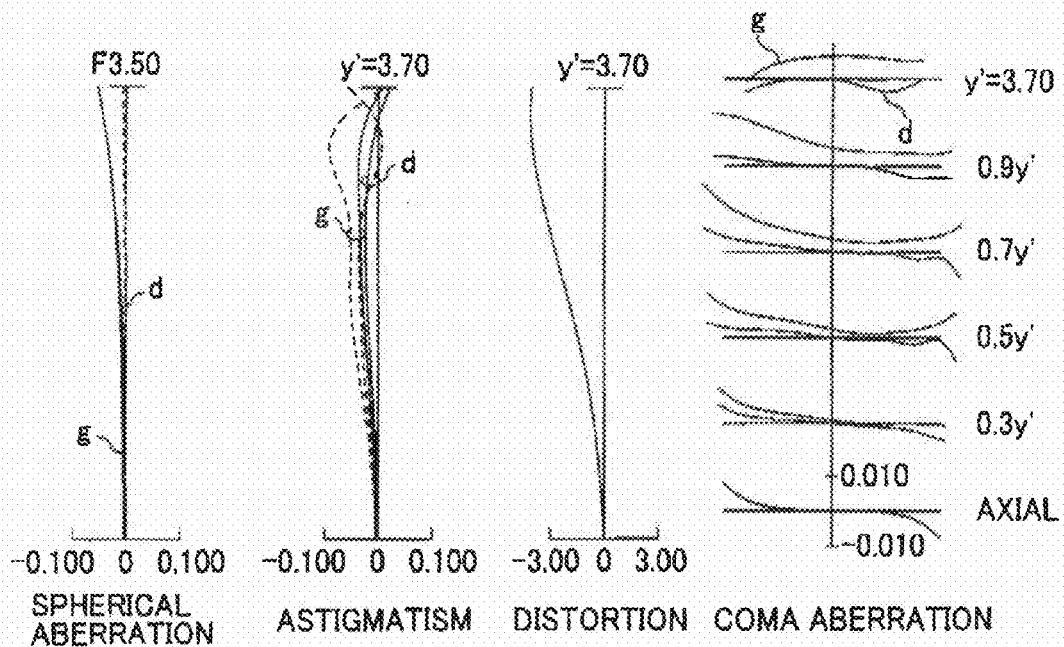
FIG. 11 is a drawing illustrating the aberration at the short focus end in the embodiment 3.
Figure 12:
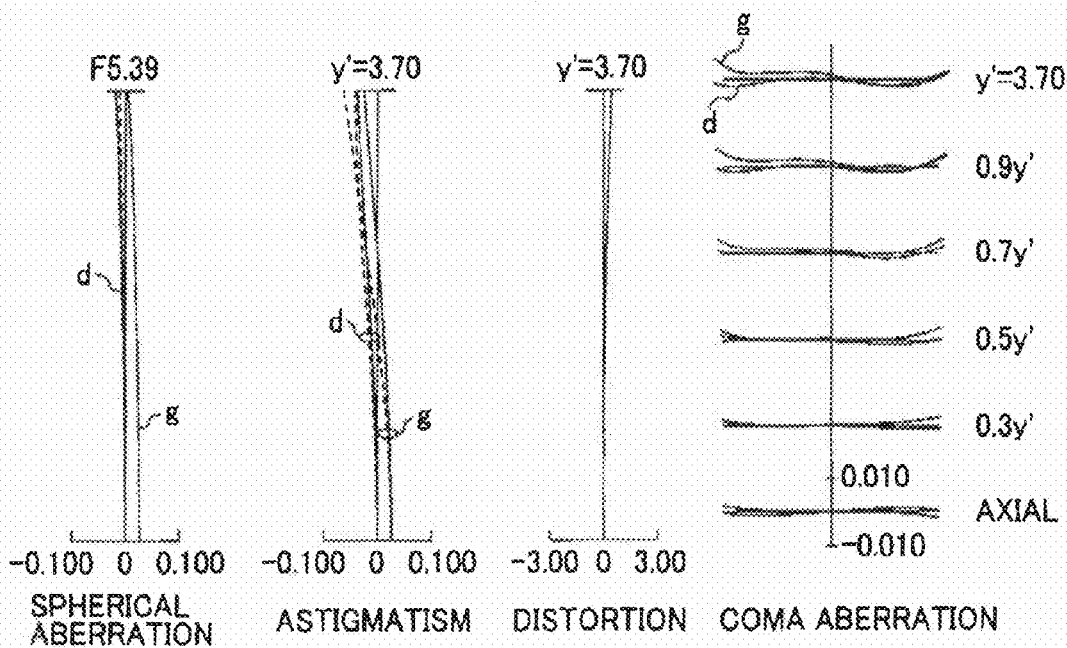
FIG. 12 is a drawing illustrating the aberration at the medium focal length in the embodiment 3.

The parameter values on the conditions $N_{d2G} = 1.936$
$v_{d2GN} = 34.52$
$v_{d2G} = 18.90$
$v_{d2GN} - v_{d2GP} = 15.62$
$X_1/f_T = 0.259$
$X_3/fT = 0.224$
$|f_2|/f_3 = 0.572$
$f_1/f_W = 6.01$
$d_{SW}/f_T = 0.194$ FIG. 11 through FIG. 13 illustrates the aberrations in relation to the embodiment 3. FIG. 11 illustrates the aberration at the short focus end, FIG. 12 illustrates the aberration at the medium focal length, and FIG. 13 illustrates the aberration at the long focus end.

Embodiment 4
f = 4.74-31.91, F = 3.50-5.56, ω = 39.21-6.45

| Surface No | R | D | $N_d$ | $v_d$ | Name of Glass Type |
|---|---|---|---|---|---|
| 01 | 39.369 | 1.00 | 1.92286 | 18.90 | OHARA S-NPH2 |
| 02 | 24.475 | 2.77 | 1.60300 | 65.44 | OHARA S-PHM53 |
| 03 | 272.535 | 0.10 | | | |
| 04 | 18.555 | 2.31 | 1.77250 | 49.60 | OHARA S-LAH66 |
| 05 | 47.482 | Variable (A) | | | |
| 06* | 34.963 | 0.74 | 1.88300 | 40.76 | OHARA S-LAH58 |
| 07 | 4.176 | 2.22 | | | |
| 08 | 46.284 | 2.06 | 1.92286 | 18.90 | OHARA S-NPH2 |
| 09 | −9.068 | 0.64 | 2.00330 | 28.27 | OHARA S-LAH79 |
| 10* | −181.083 | Variable (B) | | | |
| 11 | Aperture Stop | Variable (C) | | | |
| 12* | 6.859 | 3.02 | 1.58913 | 61.15 | OHARA L-BAL35 |
| 13* | −8.481 | 0.10 | | | |
| 14 | 13.024 | 2.11 | 1.61800 | 63.33 | OHARA S-PHM52 |
| 15 | −8.881 | 0.70 | 1.69895 | 30.13 | OHARA S-TIM35 |
| 16 | 5.023 | Variable (D) | | | |
| 17* | 9.052 | 2.37 | 1.52470 | 56.20 | Optical Plastic |
| 18 | −41.978 | Variable (E) | | | |
| 19 | −18.873 | 1.00 | 1.83481 | 42.71 | OHARA S-LAH55 |
| 20 | −44.439 | 0.780 | | | |
| 21 | ∞ | 0.90 | 1.51680 | 64.20 | Various Filter |
| 22 | ∞ | | | | |

Aspheric surface

The sixth surface $K = 0.0, A_4 = 2.06279 \times 10^{-5}, A_6 = 5.51631 \times 10^{-7},$
$A_8 = -8.31073 \times 10^{-8}, A_{10} = 1.10109 \times 10^{-9}$ The tenth surface $K = 0.0, A_4 = -5.32236 \times 10^{-4}, A_6 = 2.77146 \times 10^{-6},$
$A_8 = -1.08679 \times 10^{-6}, A_{10} = -3.45260 \times 10^{-8}$ The twelfth surface $K = 0.0, A_4 = -9.60867 \times 10^{-4}, A_6 = 4.83329 \times 10^{-6},$
$A_8 = -2.96877 \times 10^{-7}, A_{10} = -7.32967 \times 10^{-8}$ The thirteenth surface $K = 0.0, A_4 = 3.22078 \times 10^{-4}, A_6 = -1.79339 \times 10^{-6},$
$A_8 = 2.46395 \times 10^{-7}, A_{10} = -7.94954 \times 10^{-8}$ The seventeenth surface $K = 0.0, A_4 = -7.38254 \times 10^{-5}, A_6 = 7.96986 \times 10^{-6},$
$A_8 = -3.63471 \times 10^{-7}, A_{10} = 7.86601 \times 10^{-9}$ Variables

|   | Short Focus End f = 4.739 | Medium Focal Length f = 12.347 | Long Focus End f = 31.908 |
|---|---|---|---|
| A | 0.600 | 8.536 | 14.109 |
| B | 7.725 | 2.132 | 1.000 |
| C | 4.525 | 3.938 | 0.650 |
| D | 2.915 | 6.118 | 10.968 |
| E | 1.598 | 2.090 | 1.238 |

The parameter values on the conditions $N_{d2G} = 1.936$
$v_{d2GN} = 34.52$
$v_{d2G} = 18.90$
$v_{d2GN} - v_{d2GP} = 15.62$
$X_1/f_T = 0.331$
$X_3/f_T = 0.241$
$|f_2|/f_3 = 0.662$
$f_1/f_W = 6.21$
$d_{SW}/f_T = 0.142$ FIG. 14 through FIG. 16 illustrates the aberrations in relation to the embodiment 4. FIG. 14 illustrates the aberration at the short focus end, FIG. 15 illustrates the aberration at the medium focal length, and FIG. 16 illustrates the aberration at the long focus end.

In each embodiment, the aberration is sufficiently corrected, and the zoom lens is able to handle a light-receiving element having 5 to 8 million pixels.

In each embodiment, the second lens group is configured with three pieces of lenses. The lowest one of the refractive indexes of the lenses configuring the second lens group is 1.85 or more, and at least one of the lenses configuring the second lens group has the refractive index 2.00 or more.

The thickness of the first lens group and the second lens group in the embodiment 1 through the embodiment 4 are listed below, and the minimum values of the group thickness of these lens groups (thickness of the lens groups along the optical axis) in the patent documents 2, 3 are additionally listed for comparison. Here, the patent document 2 is JP-A 2006-133632, and the patent document 3 is JP-A2006-235062.

| Lens Group Thickness | First Lens Group | Second Lens Group | Sum |
|---|---|---|---|
| Embodiment 1 | 1.64 | 1.66 | 3.3 |
| Embodiment 2 | 1.66 | 1.61 | 3.27 |
| Embodiment 3 | 1.69 | 1.52 | 3.21 |
| Embodiment 4 | 1.67 | 1.53 | 3.2 |
| Embodiment 1 of the Patent Document 2 | 3.21 | 2.74 | 5.68 |
| Embodiment 4 of the Patent Document 3 | 1.86 | 1.62 | 3.48 |

As clearly found in the above table, in the zoom lens of this invention, the group thickness of the first lens group and the second lens group is effectively reduced in each embodiment. More specifically, when compared by the sum of the group thickness of the first lens group and the second lens group, the maximum one of the above sum in the embodiments of this invention is 3.3; on the other hand, even in the embodiment 1 of the patent document 2 wherein the sum of the group thickness of the first lens group and the second lens group becomes the minimum, the sum is 5.68. Therefore, the sum of the group thickness of the first lens group and the second lens group is reduced by 40% or more in the embodiments of this invention. Further, in the comparison of the value 3.48 in the embodiment 4 of the patent document 3 with the value 3.3 in the embodiment 1 of this invention, the group thickness is reduced by about 5% in the zoom lens of this invention.

Since the sum of the group thickness of the first lens group and the second lens group is small in this manner, the zoom lens of this invention is advantageous to making the body thinner, in case of the storage system of evacuating the lens groups after the aperture stop from the optical axis.

The total lens lengths (maximum total lens length) at the telephoto end in the embodiments 1-4 of this invention are listed in the following table; and the minimum values of the total lens lengths in the patent documents 2, 3 are additionally listed for comparison.

|  | Maximum Total Lens Length |
|---|---|
| Embodiment 1 | 13.99 |
| Embodiment 2 | 13.93 |
| Embodiment 3 | 14.06 |
| Embodiment 4 | 13.94 |
| Embodiments 1, 2 of the Patent Document 2 | 23.09 |
| Embodiment 4 of the Patent Document 3 | 16.20 |

As clearly found in the above table, the maximum total lens length of the zoom lens in each embodiment of this invention is reduced by about 40% in comparison to that of the parent document 2, and by 10% or more in comparison to that of the patent document 3.

The values of the above group thickness of the lens group and the maximum total lens length are given by normalizing the maximum height of image to 1.

What is claimed is:

1. A zoom lens, comprising, in order from an object side, at least:
    a first lens group having a positive refracting power;
    a second lens group having a negative refracting power;
    a third lens group having a positive refracting power; and
    an aperture stop disposed between the second lens group and the third lens group,
wherein, in changing magnification from a wide angle end toward a telephoto end, at least the first lens group and the third lens group move toward the object side so as to increase a spacing between the first lens group and the second lens group, and to decrease a spacing between the second lens group and the third lens group, and an average $N_{d2G}$ of refractive indexes in d-lines of all lenses in the second lens group satisfies the following condition:

$$1.90 < N_{d2G} < 2.10. \tag{1}$$

2. A zoom lens according to claim 1, wherein the average $N_{d2G}$ of the refractive indexes in the d-lines of the all lenses in the second lens group satisfies the following condition:

$$1.93 < N_{d2G} < 2.10. \tag{1A}$$

3. A zoom lens according to claim 1, wherein the second lens group includes three lenses or less.

4. A zoom lens according to claim 1, wherein an average $\nu_{d2GN}$ of Abbe numbers of negative lenses configuring the second lens group and an average $\nu_{d2GP}$ of Abbe numbers of positive lenses configuring the second lens group satisfy the following conditions:

$$25.0 < \nu_{d2GN} < 45.0 \tag{2A}$$

$$15.0 < \nu_{d2GP} < 23.0. \tag{2B}$$

5. A zoom lens according to claim 4, wherein the average $\nu_{d2GN}$ of the Abbe numbers of the negative lenses configuring the second lens group and the average $\nu_{d2GP}$ of the Abbe numbers of the positive lenses configuring the second lens group satisfy the following condition:

$$7.0 < \nu_{d2GN} - \nu_{d2GP} < 25.0. \tag{3}$$

6. A zoom lens according to claim 1, further comprising a fourth lens group having a positive refracting power on an image side of the third lens group, wherein a focusing to an object within a finite distance is made by a movement of the fourth lens group.

7. A zoom lens according to claim 6, comprising a subsequent lens group on the image side of the fourth lens group.

8. A zoom lens according to claim 1, wherein a whole movement $X_1$ of the first lens group in changing magnification from the wide angle end toward the telephoto end and a focal length $f_T$ of a whole system at the telephoto end satisfy the following condition:

$$0.20 < X_1/f_T < 0.70. \tag{4}$$

9. A zoom lens according to claim 1, wherein a whole movement $X_3$ of the third lens group in changing magnification from the wide angle end toward the telephoto end and a focal length $f_T$ of a whole system at the telephoto end and a focal length $f_T$ of a whole system at the telephoto end satisfies the following condition:

$$0.15 < X_3/f_T < 0.40. \tag{5}$$

10. A zoom lens according to claim 1, wherein a focal length $f_2$ of the second lens group and a focal length $f_3$ of the third lens group satisfy the following condition:

$$0.45 < |f_2|/f_3 < 0.85. \tag{6}$$

11. A zoom lens according to claim 1, wherein a focal length $f_1$ of the first lens group satisfies the following condition:

$$5.0 < f_1/f_w < 11.0, \tag{7}$$

wherein $f_w$ is a focal length of the whole system at the wide angle end.

12. A zoom lens according to claim 1, wherein, of the refractive indexes of each lens configuring the second lens group, the lowest refractive index is 1.85 or more, and at least one of the lenses configuring the second lens group has a refractive index 2.00 or more.

13. A zoom lens according to claim 1, wherein the number of the lenses configuring the zoom lens does not exceed 12.

14. An imaging device having as a photographing zoom lens a zoom lens, comprising, in order from an object side, at least:

a first lens group having a positive refracting power;
a second lens group having a negative refracting power;
a third lens group having a positive refracting power; and
an aperture stop disposed between the second lens group and the third lens group,
wherein, in changing magnification from a wide angle end toward a telephoto end, at least the first lens group and the third lens group move toward the object side so as to increase a spacing between the first lens group and the second lens group, and to decrease a spacing between the second lens group and the third lens group, and an average $N_{d2G}$ of refractive indexes in d-lines of all lenses in the second lens group satisfies the following condition:

$$1.90 < N_{d2G} < 2.10. \tag{1}$$

15. An imaging device according to claim 14, wherein an object image by the zoom lens is formed on a light-receiving surface of a color imaging element.

16. An imaging device according to claim 15, wherein the number of pixels of the imaging device is 5 to 8 million pixels or more.

17. A personal digital assistant including an imaging device having as a photographing zoom lens a zoom lens, comprising, in order from an object side, at least:

a first lens group having a positive refracting power;
a second lens group having a negative refracting power;
a third lens group having a positive refracting power; and
an aperture stop disposed between the second lens group and the third lens group,
wherein, in changing magnification from a wide angle end toward a telephoto end, at least the first lens group and the third lens group move toward the object side so as to increase a spacing between the first lens group and the second lens group, and to decrease a spacing between the second lens group and the third lens group, and an average $N_{d2G}$ of refractive indexes in d-lines of all lenses in the second lens group satisfies the following condition:

$$1.90 < N_{d2G} < 2.10. \tag{1}$$

* * * * *